United States Patent
Inada et al.

(10) Patent No.: US 9,065,946 B2
(45) Date of Patent: Jun. 23, 2015

(54) IMAGE FORMING APPARATUS

(71) Applicant: KYOCERA Document Solutions Inc., Osaka-shi, Osaka (JP)

(72) Inventors: Teruhiko Inada, Osaka (JP); Nobuhiro Fukuma, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/289,505

(22) Filed: May 28, 2014

(65) Prior Publication Data

US 2014/0355084 A1    Dec. 4, 2014

(30) Foreign Application Priority Data

May 31, 2013  (JP) .................................. 2013-114874
Mar. 28, 2014  (JP) .................................. 2014-070268

(51) Int. Cl.
*H04N 1/04*    (2006.01)
*H04N 1/00*    (2006.01)

(52) U.S. Cl.
CPC ....... *H04N 1/00554* (2013.01); *H04N 1/00625* (2013.01)

(58) Field of Classification Search
CPC ......... H04N 5/232; H04N 13/02; H04N 1/00; H04N 1/60; H04N 7/18; H04N 1/028; H04N 5/235; H04N 5/262; H04N 13/00; H04N 13/04; H04N 1/024; H04N 5/217; H04N 5/225; H04N 5/265; H04N 5/367
See application file for complete search history.

(56) References Cited

U.S. PATENT DOCUMENTS

| | | | | |
|---|---|---|---|---|
| 4,685,792 A * | 8/1987 | Iseki et al. | ..................... | 271/114 |
| 5,650,847 A * | 7/1997 | Maltsev et al. | ............... | 356/336 |
| 6,510,301 B2 * | 1/2003 | Tanaka | .......................... | 399/125 |
| 7,804,628 B2 * | 9/2010 | Hashimoto et al. | ........... | 358/494 |
| 8,244,167 B2 * | 8/2012 | Andoh et al. | ................. | 399/381 |
| 8,570,624 B2 * | 10/2013 | Nagashima | ................... | 358/498 |
| 8,605,300 B2 * | 12/2013 | Nagasgima et al. | ......... | 358/1.13 |
| 8,774,675 B2 * | 7/2014 | Fukuda | ......................... | 399/110 |
| 8,781,365 B2 * | 7/2014 | Inoue | ............................. | 399/124 |
| 8,817,337 B2 * | 8/2014 | Matsui | .......................... | 358/474 |
| 8,837,988 B1 * | 9/2014 | Hara et al. | ..................... | 399/125 |
| 2008/0317498 A1 * | 12/2008 | Andoh et al. | ................. | 399/110 |

(Continued)

FOREIGN PATENT DOCUMENTS

JP    2011227495 A    11/2011

*Primary Examiner* — Negussie Worku
(74) *Attorney, Agent, or Firm* — Alleman Hall McCoy Russell & Tuttle LLP

(57) ABSTRACT

An image forming apparatus includes: document reading device; document holder; and first locking device. Document reading device is provided so as to be openable and closable relative to apparatus body. Document holder is provided so as to be openable and closable relative to document reading device. First locking device locks document holder so as to prevent document holder from performing opening operation in the case of the document reading device performing opening operation. Document reading device includes an opening. First locking device includes: locking member, first hook member, and lid member. Locking member is inserted into the opening in a state where document holder is closed relative to document reading device. First hook member is engaged with locking member inserted in the opening, below document placing surface. Lid member is movable between closing position at which the opening is closed, and opening position at which the opening is opened.

10 Claims, 28 Drawing Sheets

(56) References Cited

U.S. PATENT DOCUMENTS

2009/0122330 A1* 5/2009 Andoh et al. ............... 358/1.13
2011/0134455 A1* 6/2011 Nagashima et al. ......... 358/1.13
2011/0242626 A1* 10/2011 Nagashima ................... 358/498

* cited by examiner

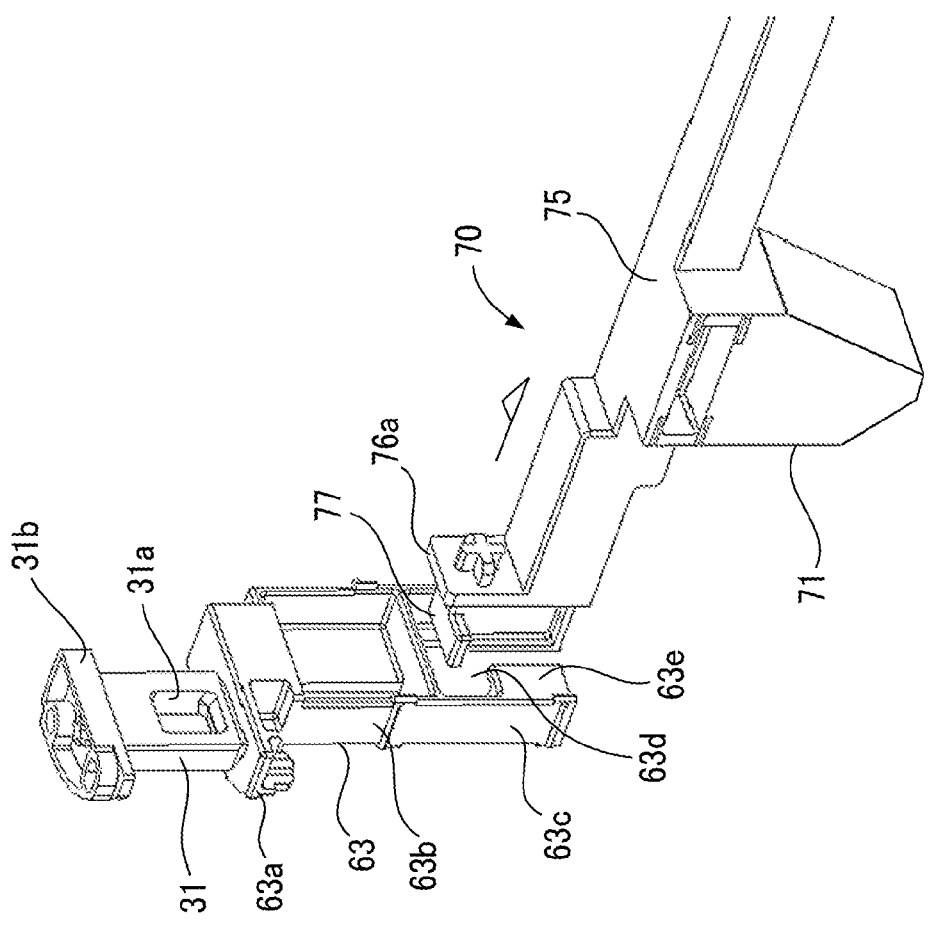
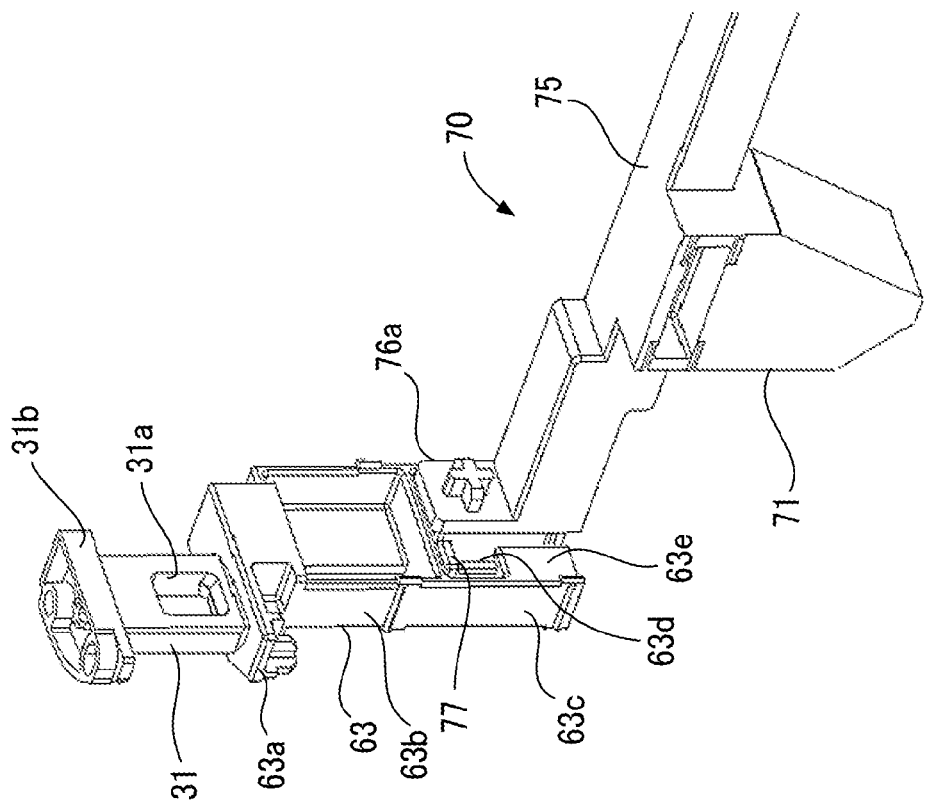

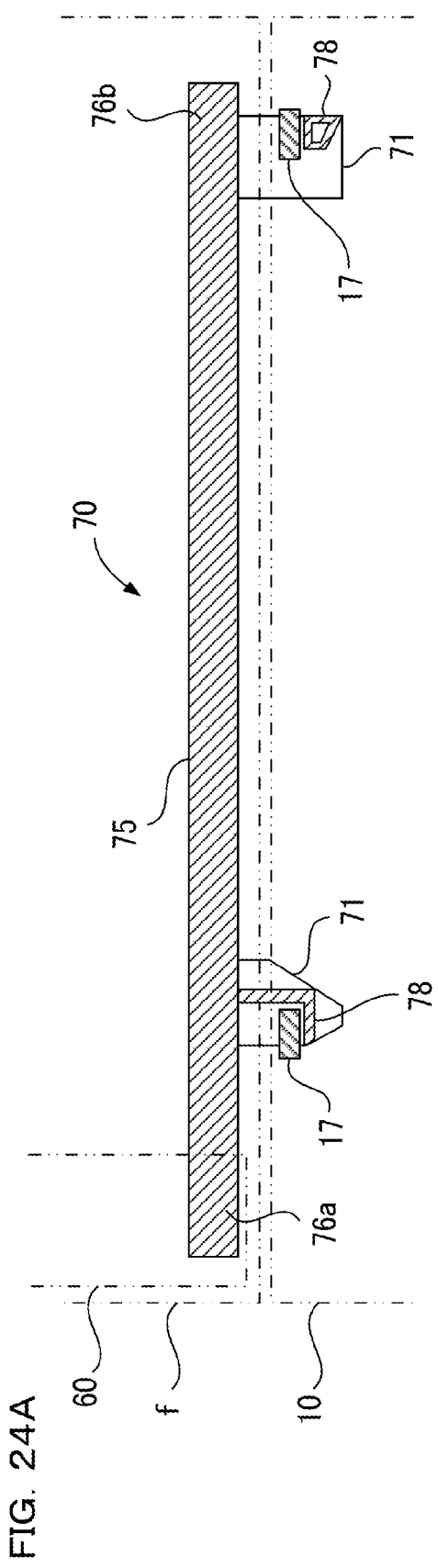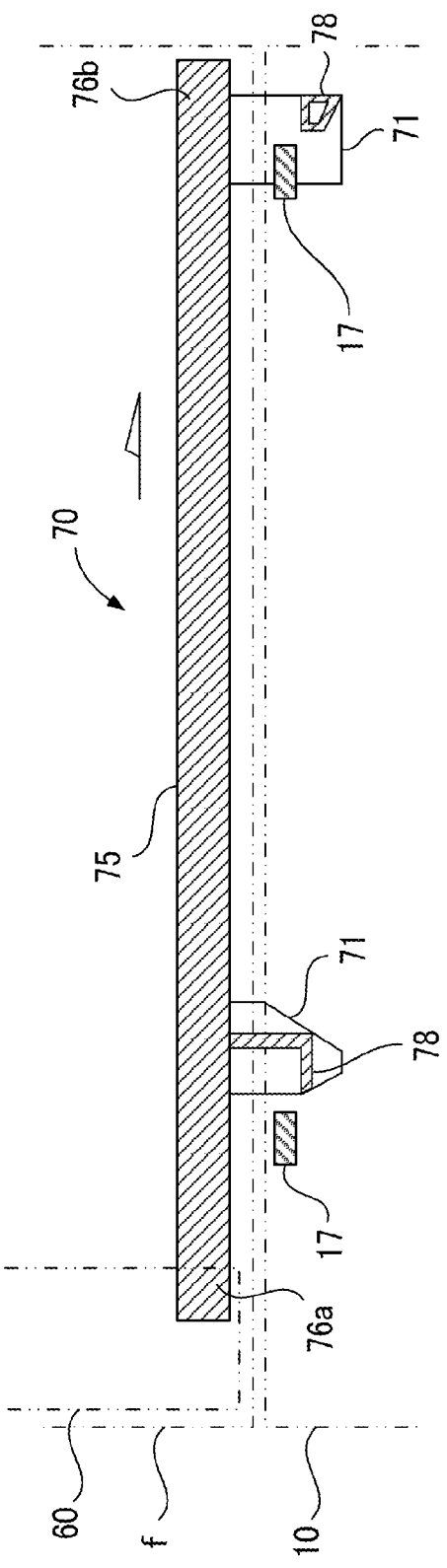

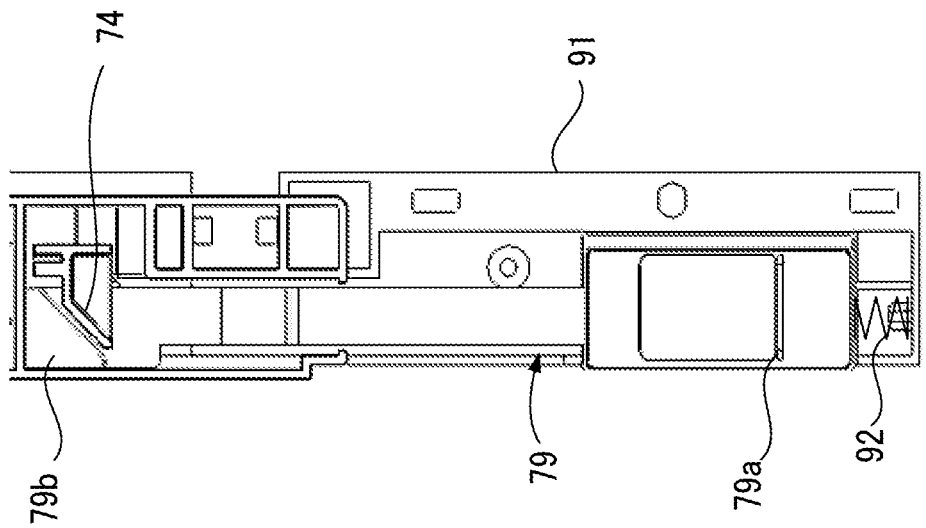
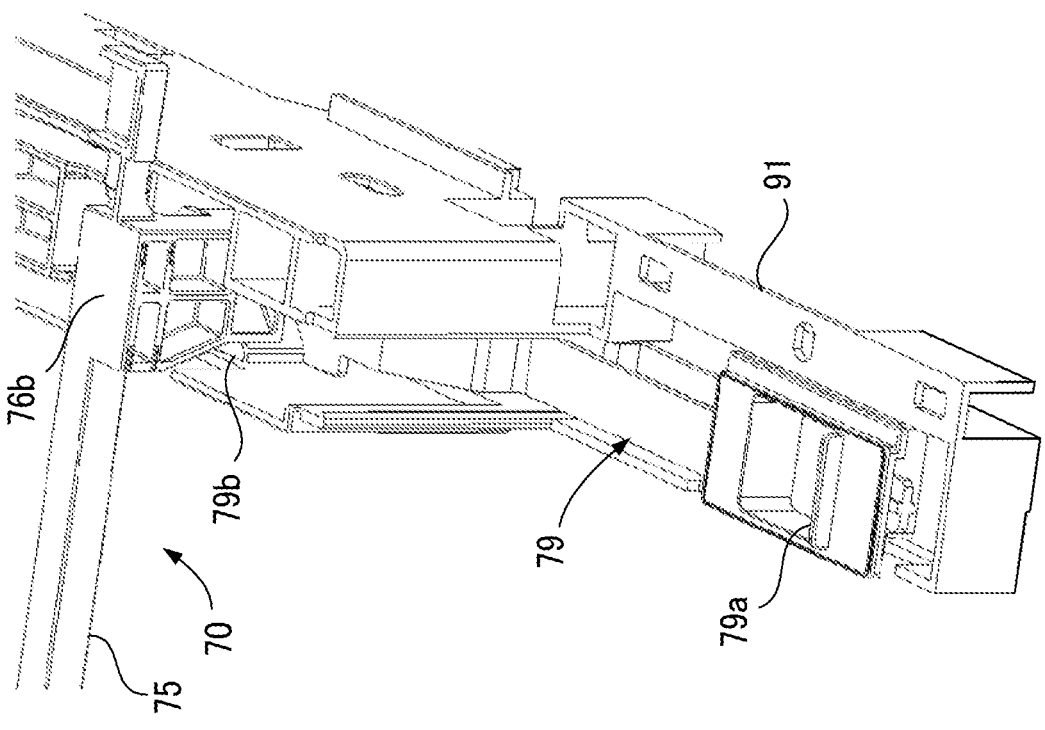
FIG. 25A
FIG. 25B

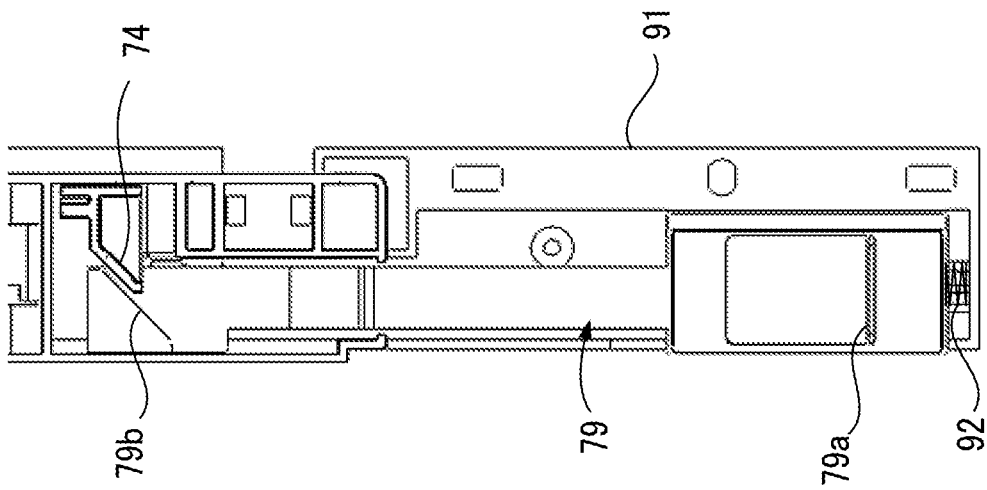
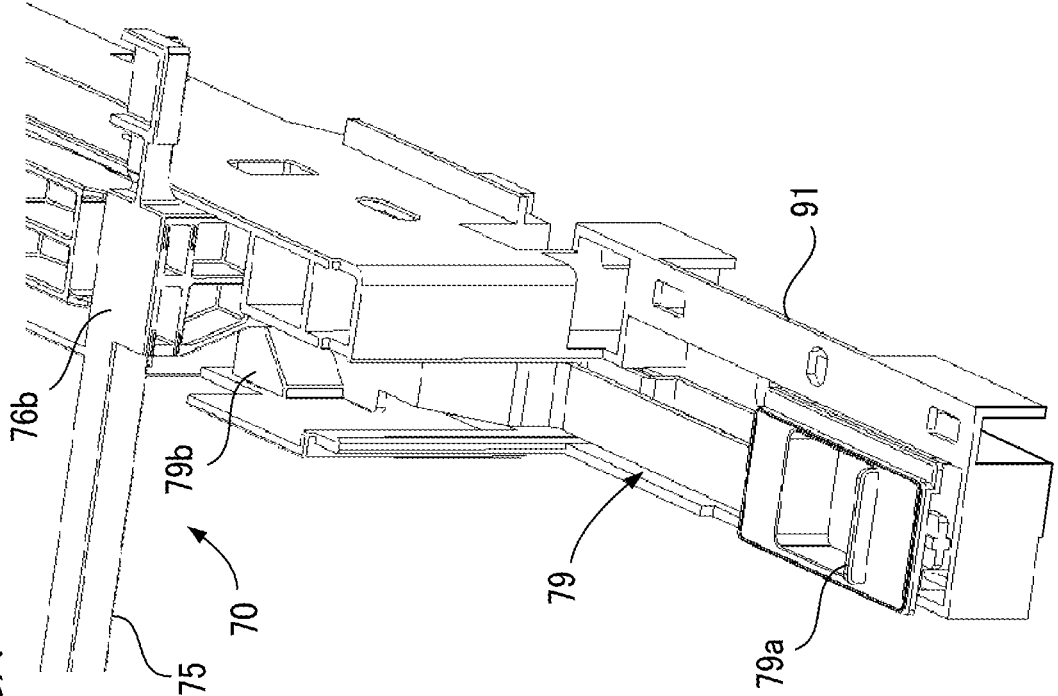

IMAGE FORMING APPARATUS

INCORPORATION BY REFERENCE

This application is based upon and claims the benefit of priority from the corresponding Japanese Patent Application No. 2013-114874 filed on May 31, 2013, and No. 2014-070268 filed on Mar. 28, 2014, the entire contents of which are incorporated herein by reference.

BACKGROUND

The present disclosure relates to image forming apparatuses.

In some of image forming apparatuses, such as copy machines and multifunction peripherals (MFP), which form images on sheets by electrophotography, a document reading device is disposed in an upper portion of an apparatus body. The document reading device lights a document from the back of a contact glass, to optically read the document by using a CCD (Charge Coupled Device) sensor or the like. To date, the image forming apparatuses including the document reading devices have been known.

In the apparatus body of the image forming apparatus, components such as a drum unit and a toner cartridge are disposed. In the conventional image forming apparatus, the document reading device is provided so as to be openable and closable relative to the apparatus body in order to enable the components to be replaced. When the document reading device is moved upward so as to open, an opening, formed in the apparatus body, which has been closed by the document reading device is opened. Thus, a user is allowed to access the inside of the apparatus body through the opening, thereby enabling the user to, for example, replace a predetermined component.

In the document reading device, a document holder which presses a document against a document placing surface is provided so as to be openable and closable. When a user opens the document reading device, if the document holder is further opened, the document holder may be greatly inclined backward of the apparatus body, and the center of gravity of the entirety of the image forming apparatus may shift and the apparatus body may fall backward. In particular, when the document holder has a document feed device (ADF) mounted therein, the weight of the document holder is increased, so that the apparatus body is more likely to fall backward.

Therefore, the conventional image forming apparatus includes a locking mechanism that locks the document holder so as to prevent the document holder from performing opening and closing operation relative to the document reading device. The locking mechanism includes a document holder locking member disposed in the document holder, and a hook that is pivotably mounted in the document reading device, and is engaged with or disengaged from the document holder locking member. The hook is pivoted in conjunction with the opening and closing of the document reading device, to be engaged with or disengaged from the document holder locking member. Such a locking mechanism allows the document holder to be opened and closed in a state where the document reading device is closed, and locks the document holder so as to prevent the document holder from performing opening and closing operation in a state where the document reading device is opened relative to the apparatus body.

SUMMARY

An image forming apparatus according to one aspect of the present disclosure includes: a document reading device; a document holder; and a first locking device. The document reading device is provided so as to be openable and closable relative to an apparatus body. The document holder is provided so as to be openable and closable relative to the document reading device. The first locking device locks the document holder so as to prevent the document holder from performing opening operation in the case of the document reading device performing opening and closing operation. The document reading device includes an opening that is used for locking the document holder so as to prevent the document holder from performing opening operation, and the opening is formed so as to be coplanar with a document placing surface on which a document is placed. The first locking device includes a locking member, a first hook member, and a lid member. The locking member is provided in the document holder and configured to be inserted into the opening in a state where the document holder is closed relative to the document reading device. The first hook member is provided in the document reading device, and configured to be engageable with the locking member inserted in the opening, below the document placing surface. The lid member is provided in the document reading device and configured to be movable between a closing position at which the opening is closed, and an opening position at which the opening is opened by the lid member being moved downward of the document placing surface.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 20A and FIG. 20B are each a perspective view illustrating a structure and operation of a movable member of the opening and closing operation locking unit according to the second embodiment of the present disclosure.

FIG. 24A and FIG. 24B illustrate an action of the sliding member according to the second embodiment of the present disclosure, and FIG. 24A illustrating an operation position in a locked state, and FIG. 24B illustrating an operation position in an unlocked state.

FIG. 25A and FIG. 25B illustrate a structure and action of a lever member of the third locking device according to the second embodiment of the present disclosure.

FIG. 26A and FIG. 26B illustrate a structure and action of the lever member according to the second embodiment of the present disclosure.

DETAILED DESCRIPTION

Hereinafter, a first embodiment and a second embodiment of the present disclosure will be described with reference to the drawings. In the below description, a multifunction peripheral that has a document reading function will be described as an example of an image forming apparatus of the present disclosure.

First Embodiment

Figure 1:
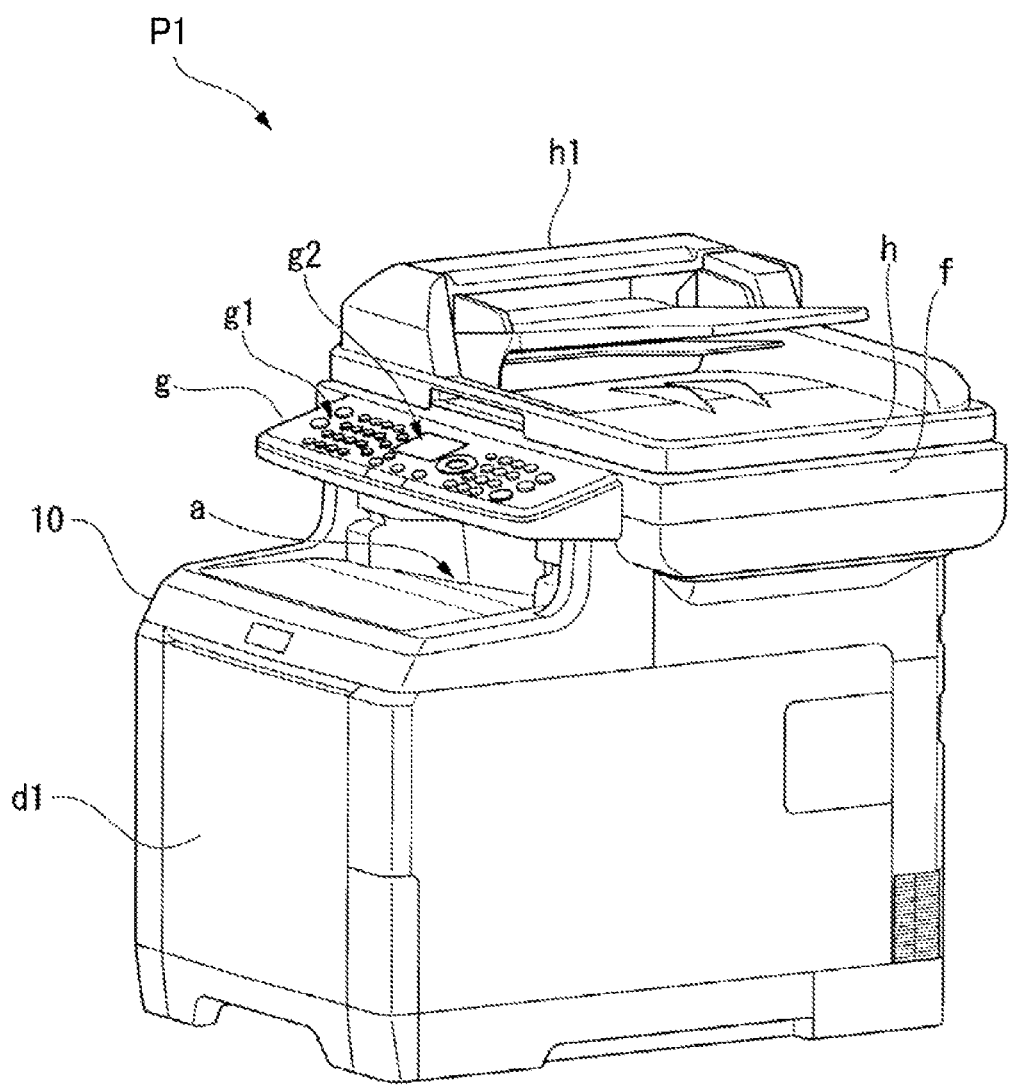
FIG. 1 is a perspective view illustrating an external appearance of a multifunction peripheral according to a first embodiment of the present disclosure.
Figure 2:
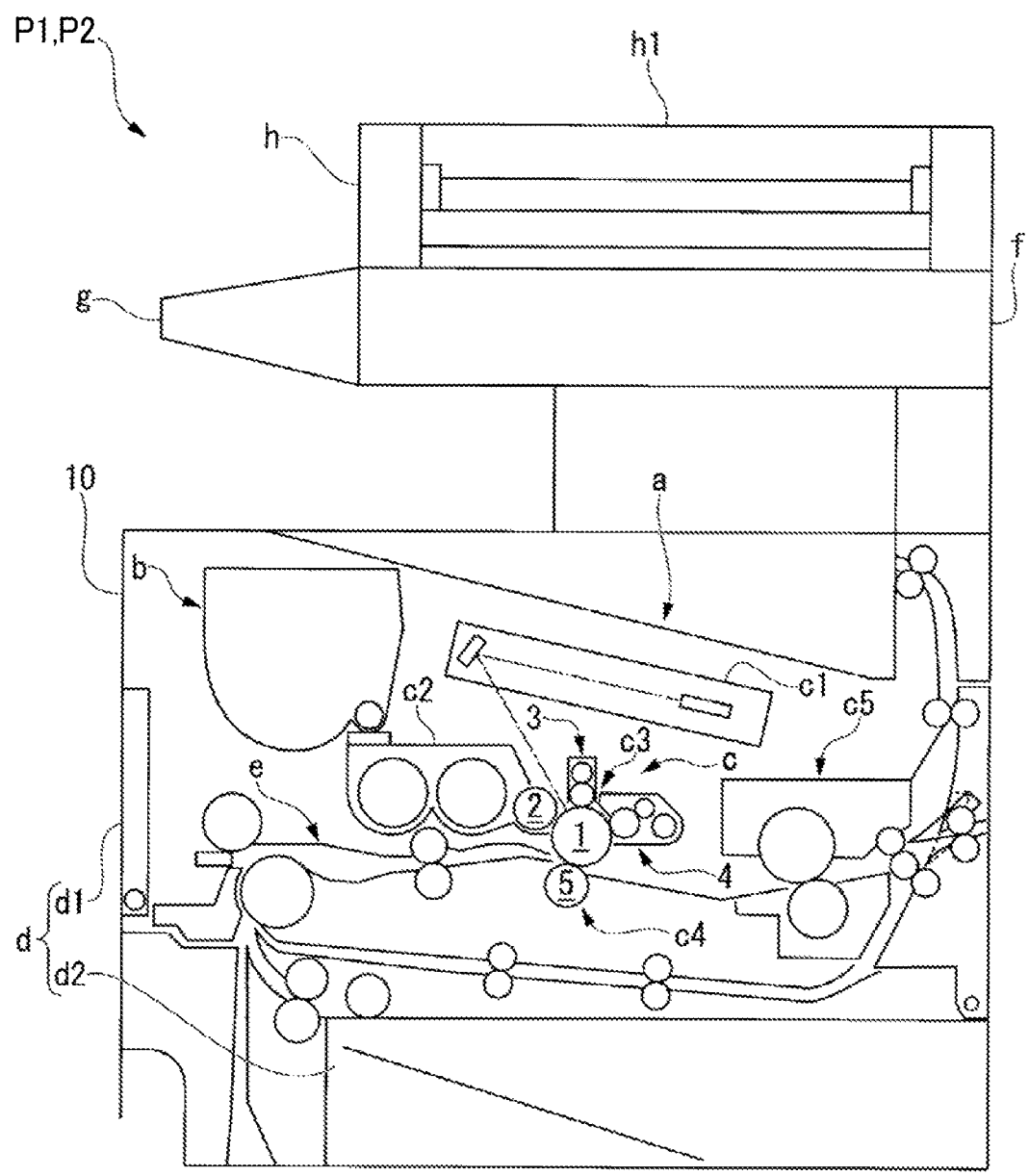
FIG. 2 illustrates an internal structure of the multifunction peripherals according to the first embodiment and a second embodiment of the present disclosure.

Hereinafter, the first embodiment of the present disclosure will be described. FIG. 1 is a perspective view illustrating an external appearance of a multifunction peripheral P1 according to the first embodiment of the present disclosure. FIG. 2 is a schematic diagram illustrating an internal structure of the multifunction peripheral P1 according to the first embodiment of the present disclosure. As shown in FIG. 2, the multifunction peripheral P1 (image forming apparatus) includes an apparatus body 10, a discharge portion (a), a toner storage portion (b), an image forming portion (c), and a sheet portion (d). Further, the multifunction peripheral P1 includes a conveying portion (e) that extends from the sheet portion (d) located in a lower portion to the discharge portion (a) located in an upper portion. Moreover, the multifunction peripheral P1 includes a scanner portion (f) (document reading device), an operation portion (g), and a document holder (h) on and above the discharge portion (a).

The discharge portion (a) is structured such that a sheet (sheet member) having a predetermined image formed thereon is discharged through the conveying portion (e) into the discharge portion (a). The bottom surface of the discharge portion (a) is inclined. Therefore, when a plurality of sheets are discharged into the discharge portion (a), the plurality of sheets are layered in the discharge portion (a) in a state where one ends of the sheets are aligned with each other.

The toner storage portion (b) includes a toner container in which, for example, black toner is stored. The toner storage portion (b) is structured so as to supply toner to a developing unit c2 of the image forming portion (c).

The image forming portion (c) includes a laser scanning unit c1, the developing unit c2, a drum unit c3, a transfer unit c4, and a fixing unit c5.

The laser scanning unit c1 includes a light beam generator, a polygon mirror that scans a light beam, an fθ lens that focuses the scanned light beam into an image, and the like, similarly to a well-known laser scanning unit.

The developing unit c2 supplies toner to a photosensitive drum 1 to develop an electrostatic latent image formed on a circumferential surface of the photosensitive drum 1. The developing unit c2 includes a developing roller 2 that is disposed so as to face the circumferential surface of the photosensitive drum 1.

The drum unit c3 includes the photosensitive drum 1. An electrostatic latent image is formed on the circumferential surface of the photosensitive drum 1 by the laser scanning unit c1. The electrostatic latent image is developed into a toner image by using toner supplied from the toner storage portion (b) to the developing unit c2.

Around the photosensitive drum 1, a charging unit 3 that charges the circumferential surface of the photosensitive drum 1, a cleaner 4 that removes toner remaining on the circumferential surface thereof after transfer, and the like are disposed. The charging unit 3, the cleaner 4, the photosensitive drum 1, and the like according to the present embodiment form, as the drum unit c3, a unit which is detachably mounted.

The transfer unit c4 includes a transfer roller 5 that is disposed so as to face the circumferential surface of the photosensitive drum 1. The transfer roller 5 is disposed so as to press the photosensitive drum 1.

Therefore, when the photosensitive drum 1 is driven into rotation, the transfer roller 5 is allowed to rotate according to the rotation of the photosensitive drum 1. Further, when a paper sheet, which is an example of a predetermined sheet member, is conveyed through the conveying portion (e), the transfer roller 5 is rotated so as to nip the paper sheet between the transfer roller 5 and the photosensitive drum 1, thereby enabling the paper sheet to be conveyed toward the fixing unit c5.

The fixing unit c5 is disposed, in the conveying portion (e), downstream of the transfer unit c4 in the paper sheet conveying direction. The fixing unit c5 is disposed in a portion of the conveying portion (e). The fixing unit c5 is structured as a pair of rollers disposed so as to nip the paper sheet conveyed in the conveying portion (e). The fixing unit c5 is structured so as to fix, onto the paper sheet, the toner image which has been transferred onto the paper sheet by the transfer unit c4, by performing pressuring and heating by the pair of rollers.

The sheet portion (d) includes a sheet feed tray d1 and a sheet feed cassette d2. The sheet feed tray d1 is provided so as to be openable and closable relative to the apparatus body 10. The sheet feed cassette d2 is provided so as to be drawable from the apparatus body 10. The sheet portion (d) is structured so as to feed paper sheets one by one from the sheet feed tray d1 or the sheet feed cassette d2 into the conveying portion (e).

The conveying portion (e) is provided so as to extend from the sheet portion (d) that is located in the lower portion to the discharge portion (a) that is located in the upper portion. The conveying portion (e) includes a plurality of conveying rollers and guide plates. The conveying portion (e) is structured so as to convey the paper sheets fed from the sheet portion (d), one by one, toward the discharge portion (a).

The scanner portion (f) reads a document having been set, and obtains document image data representing an image of the document. The scanner portion (f) includes a CCD (Charge Coupled Device) sensor (not shown) mounted in a carriage. The scanner portion (f) is configured to read a document set on a contact glass f1 (see FIG. 3) or documents that are sequentially fed by a document feed device h1. A hinge unit 19 is disposed on the rear side of the scanner portion (f). The scanner portion (f) is openable and closable relative to the apparatus body 10 by means of the hinge unit 19 (see FIG. 27).

The operation portion (g) outputs a signal (operation signal) corresponding to an operation performed by a user, and displays various information such as information representing a state of the multifunction peripheral P1. The operation portion (g) includes an operation key g1 and an operation display portion g2 (see FIG. 1). The operation key g1 is implemented as a hardware key such as a copy start key, a copy stop/clearing key, a numerical keypad (number input key), and a function switching key. The operation display portion g2 is implemented as a touch panel that is disposed so as to face a display screen such as a liquid crystal panel or an organic electroluminescence panel. The operation display portion g2 outputs, as the operation signal, a signal that indicates coordinates representing a portion pressed by a user.

The document holder (h) presses a document against a reading surface of the scanner portion (f). The document holder (h) is provided so as to be openable and closable relative to the scanner portion (f). The document feed device h1 that automatically performs sequential feeding of documents to be read is mounted to the document holder (h). The document feed device h1 continuously feeds the documents having been set, through the scanner portion (f), into a conveying path (not shown), by means of a pickup roller (not shown). The scanner portion (f) includes a slit-shaped contact glass f2 (see FIG. 3) that is different from the contact glass f1. The documents that are automatically fed by the document feed device h1 are read through the slit-shaped contact glass f2.

In the multifunction peripheral P1 having the above structure, laser light corresponding to the image data is applied from the laser scanning unit c1 to the photosensitive drum 1, to form an electrostatic latent image on the photosensitive drum 1. The electrostatic latent image is developed into a toner image by using the supplied toner. The toner image carried on the photosensitive drum 1 is transferred to a paper sheet by the transfer unit c4, and is thereafter pressurized and heated by the fixing unit c5, to be fixed. Finally, the paper sheet having the image fixed thereon is discharged into the discharge portion (a).

Figure 5:
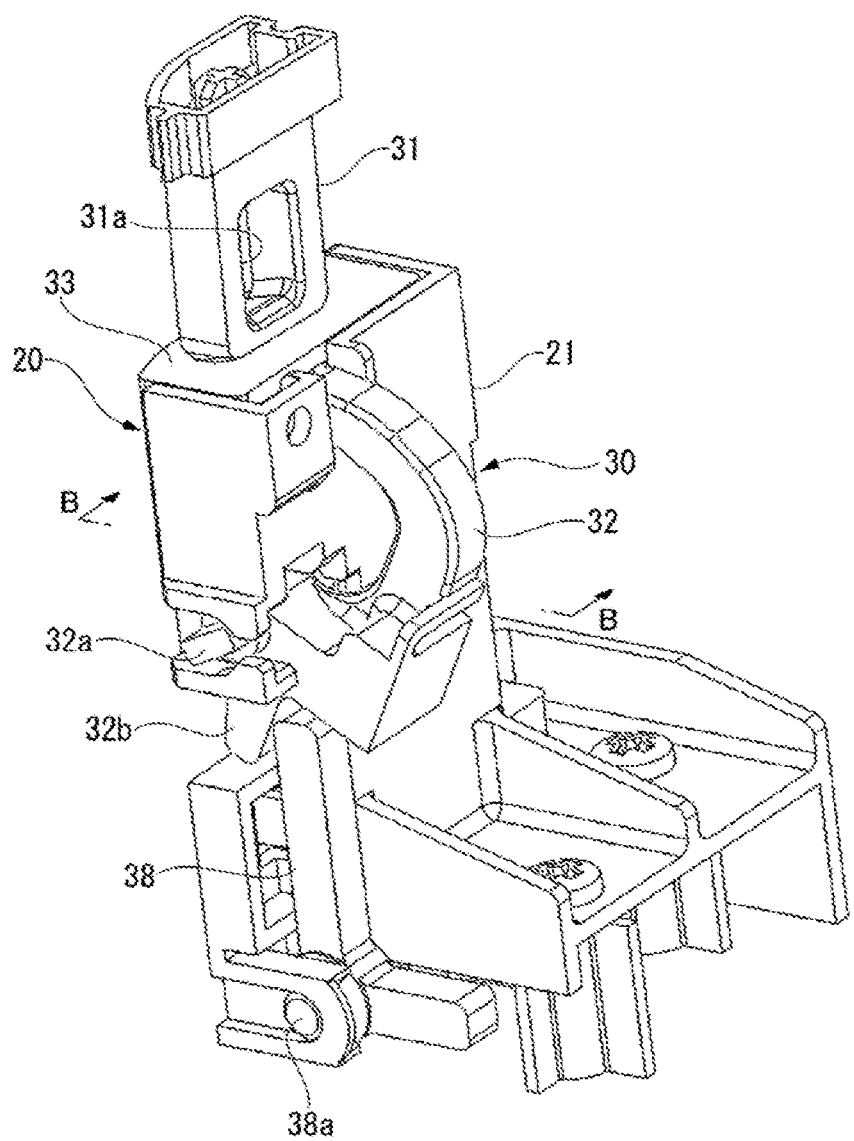
FIG. 5 is a perspective view illustrating an external appearance of an opening and closing operation locking unit according to the first embodiment of the present disclosure.
Figure 6:
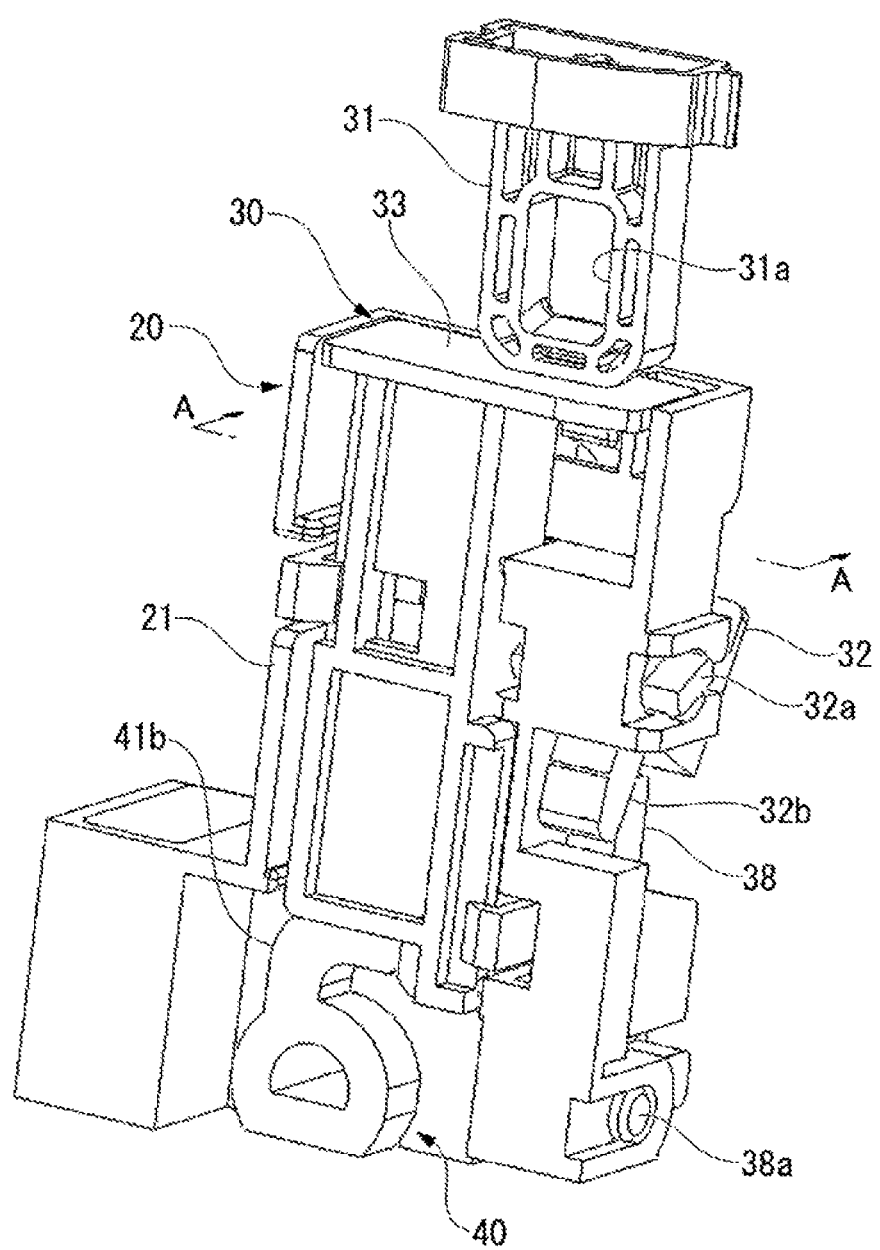
FIG. 6 is a perspective view illustrating an external appearance of the opening and closing operation locking unit according to the first embodiment of the present disclosure.
Figure 7:
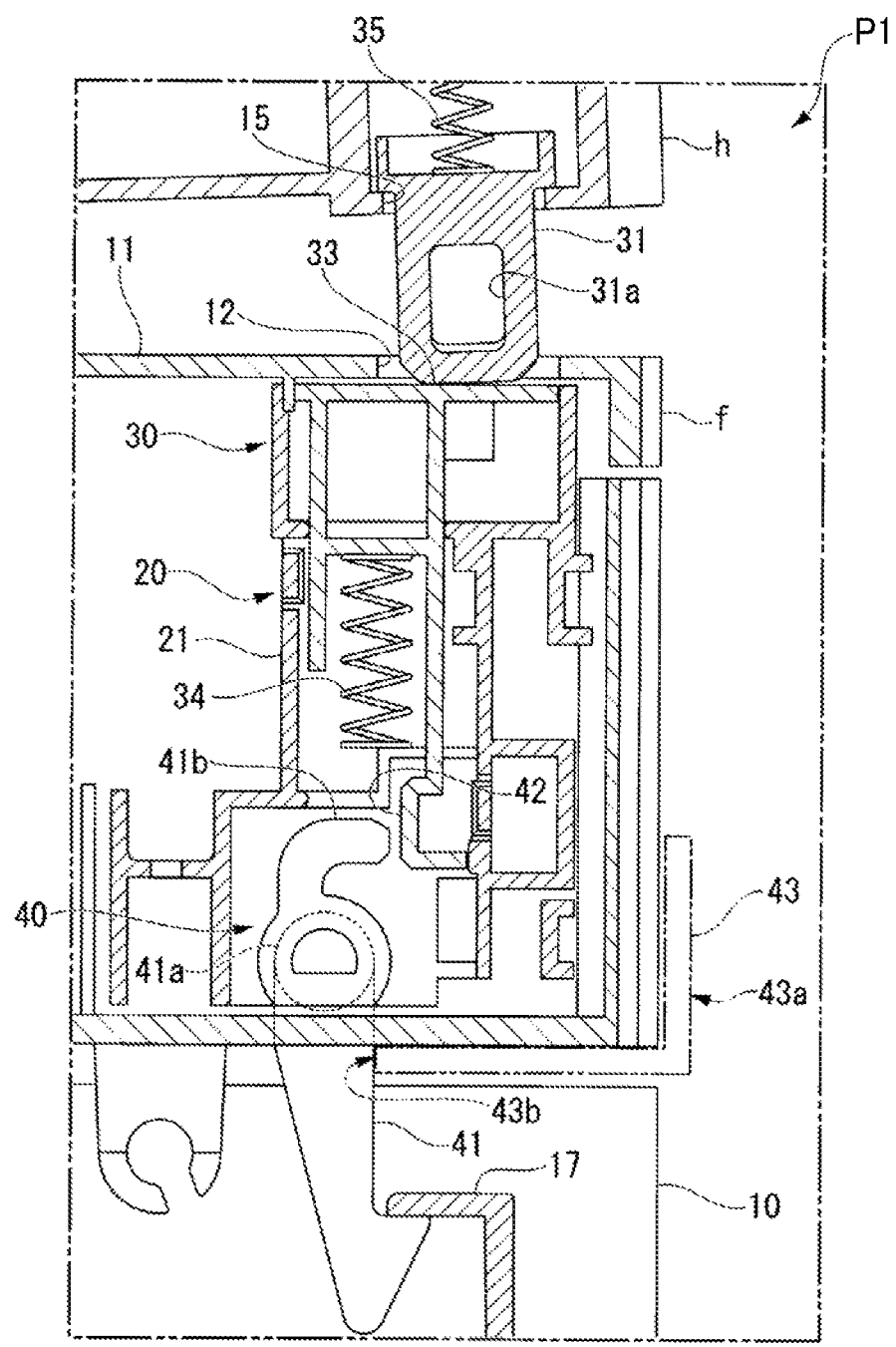
FIG. 7 is a cross-sectional view illustrating positioning of components of the opening and closing operation locking unit in a state where a lid member is positioned at a closing position according to the first embodiment of the present disclosure.
Figure 8:
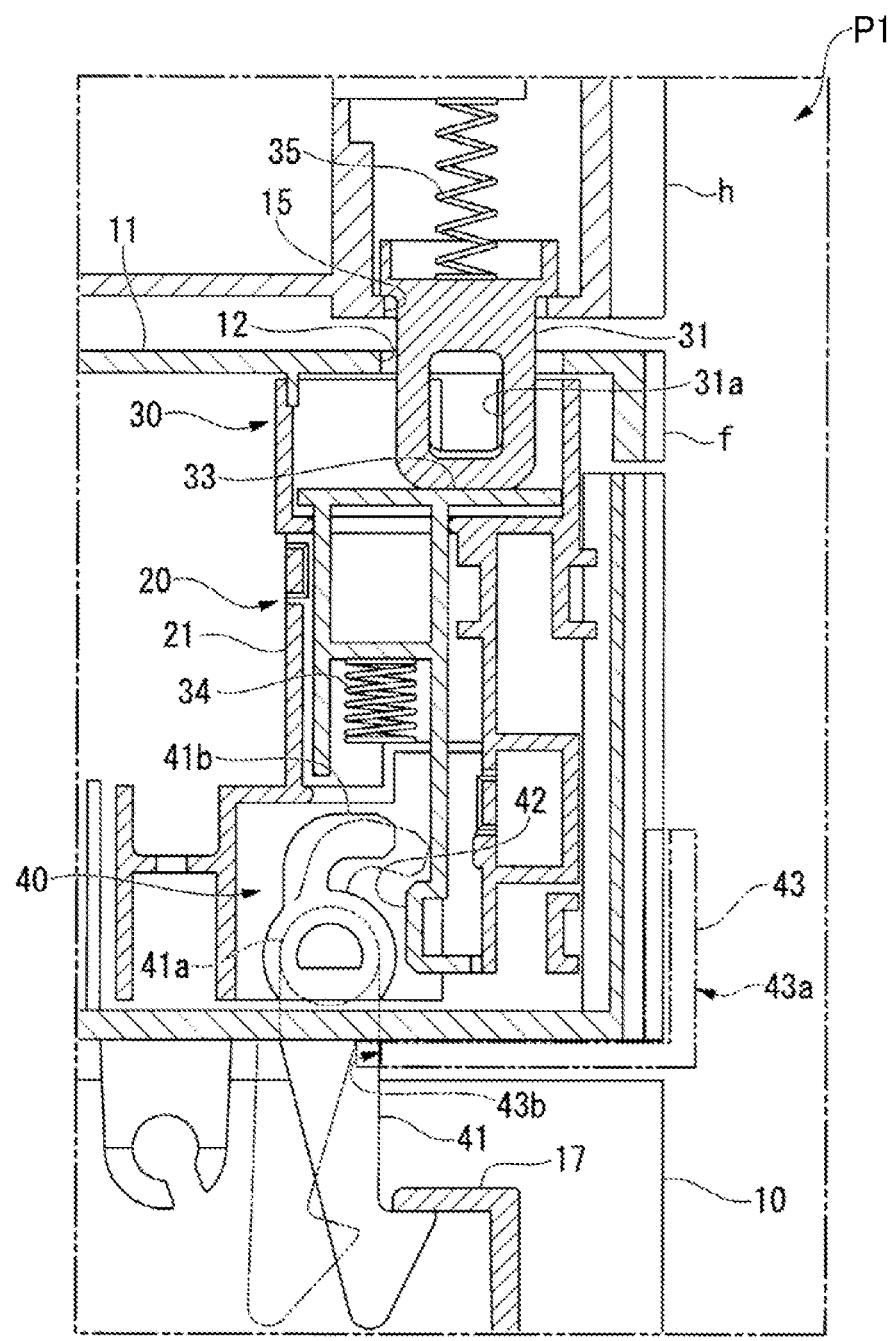
FIG. 8 is a cross-sectional view illustrating positioning of the components of the opening and closing operation locking unit in a state where the lid member is positioned at an opening position according to the first embodiment of the present disclosure.
Figure 10:
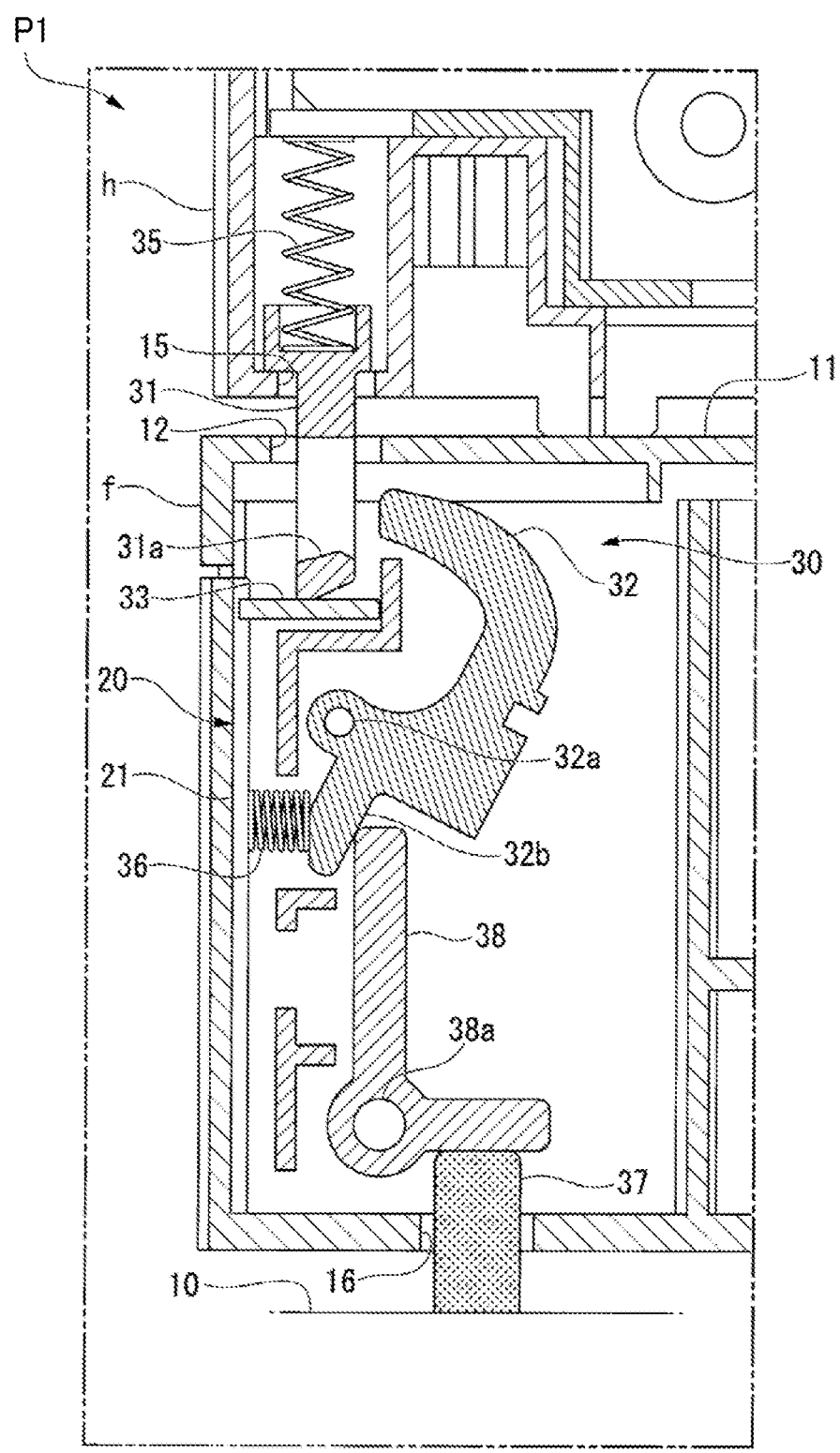
FIG. 10 is a cross-sectional view illustrating positioning of the components of the opening and closing operation locking unit in a state where the scanner portion is closed according to the first embodiment of the present disclosure.
Figure 11:
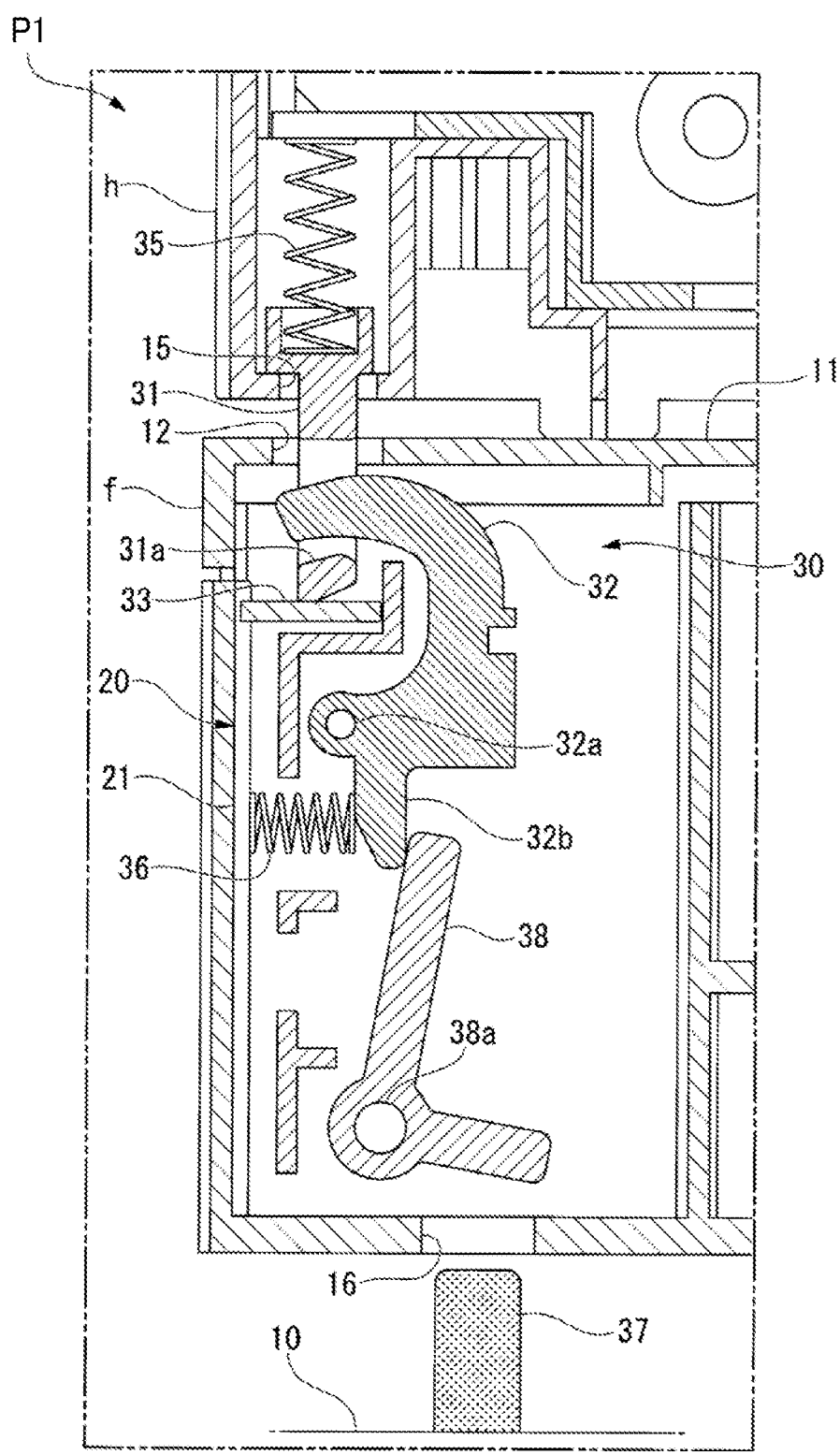
FIG. 11 is a cross-sectional view illustrating positioning of the components of the opening and closing operation locking unit in a state where the scanner portion is opened according to the first embodiment of the present disclosure.

Next, with reference to FIG. 3 to FIG. 11, FIG. 27, and FIG. 28, a structure of an opening operation locking unit 20, for the scanner portion (f) and the document holder (h), which is included in the multifunction peripheral P1 will be described in detail. FIG. 7 and FIG. 8 each illustrate a cross-section as seen from the direction of arrows A-A in FIG. 6. FIG. 10 and FIG. 11 each illustrate a cross-section as seen from the direction of arrows B-B in FIG. 5.

Figure 27:
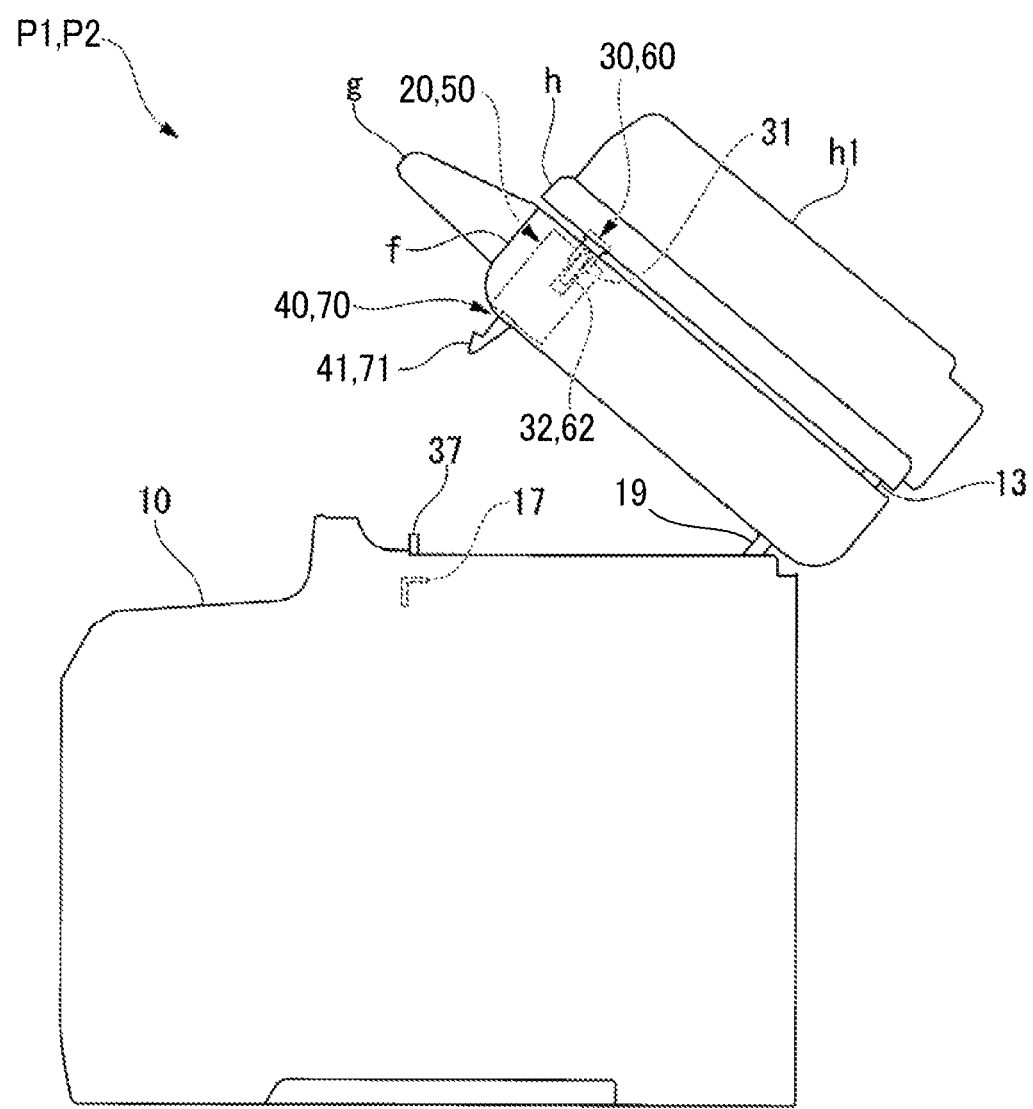
FIG. 27 illustrates an action of the opening and closing operation locking unit according to the first embodiment and the second embodiment of the present disclosure.

As described above, the document holder (h) is provided so as to be openable and closable relative to the scanner portion (f). Further, the scanner portion (f) is provided so as to be openable and closable relative to the apparatus body 10 as shown in FIG. 27.

The opening operation locking unit 20 includes a locking device 30 (first locking device) that locks the document holder (h) so as to prevent the document holder (h) from performing opening operation relative to the scanner portion (f), and a locking device 40 (second locking device) that locks the scanner portion (f) so as to prevent the scanner portion (f) from performing opening operation relative to the apparatus body 10. The opening operation locking unit 20 is structured as a unit having a mechanism in which the locking device 30 and the locking device 40 operate in conjunction with each other (see FIG. 5 and FIG. 6).

Figure 3:
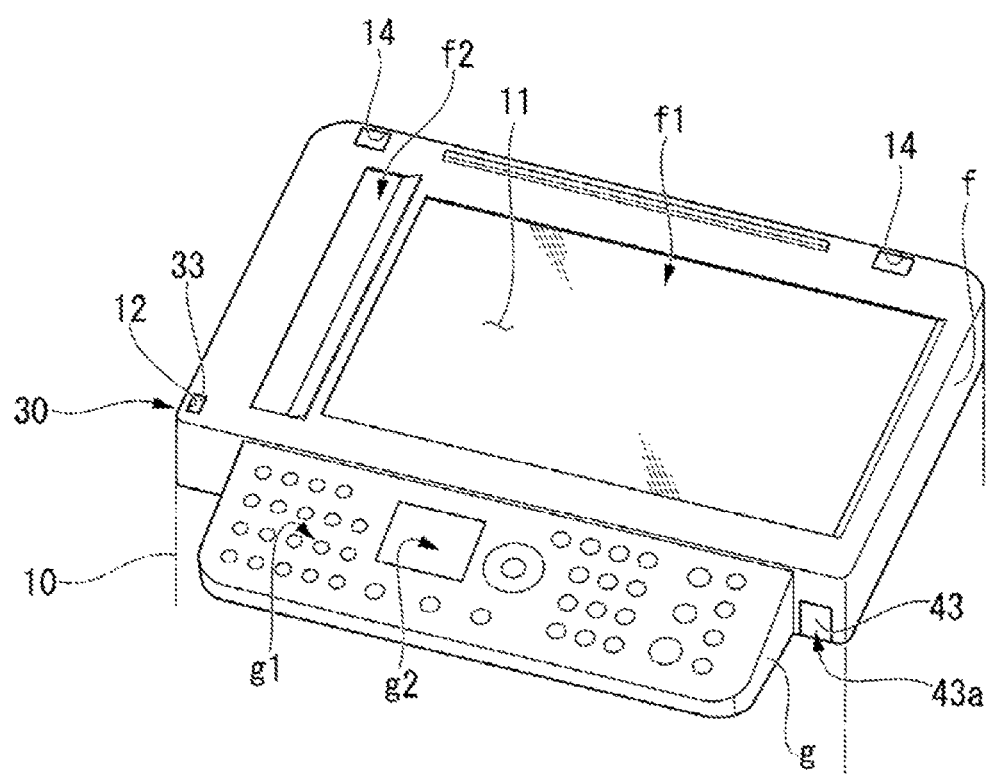
FIG. 3 is a perspective view illustrating an external appearance of a scanner portion according to the first embodiment of the present disclosure.

The locking device 30 locks the document holder (h) so as to prevent the document holder (h) from performing opening operation when the scanner portion (f) performs opening. As shown in FIG. 3, the scanner portion (f) has an opening 12 used for locking the document holder (h) so as to prevent the document holder (h) from performing opening operation. The opening 12 is formed so as to be coplanar with a document placing surface 11 on which a document is placed. The opening 12 is formed so as to be open upward, at a corner portion of the scanner portion (f) on the front side thereof. The opening 12 is located apart from the contact glass f1 which is easily touched by a user than from the slit-shaped contact glass f2.

Figure 4:
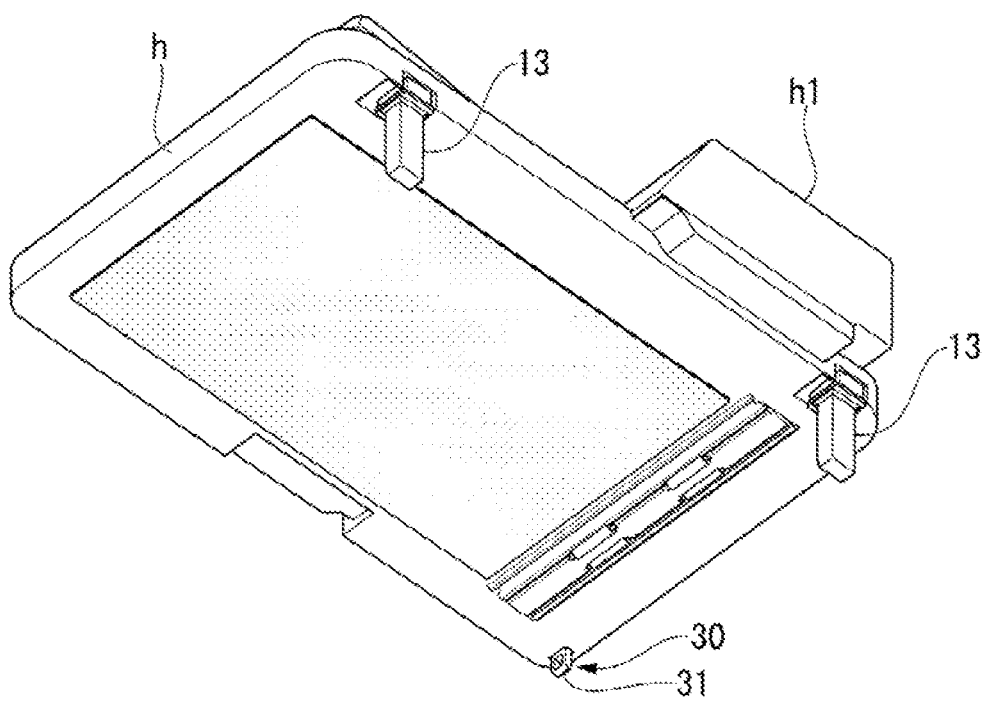
FIG. 4 is a perspective view illustrating an external appearance of a document holder according to the first embodiment of the present disclosure.

The locking device 30 includes a locking member 31 provided in the document holder (h) as shown in FIG. 4. The locking member 31 can be inserted into the opening 12 in a state where the document holder (h) is closed relative to the scanner portion (f). Hinge units 13 are disposed on the rear side of the document holder (h). The hinge units 13 are mounted in openings 14 formed on the rear side of the scanner portion (f) as shown in FIG. 3. Therefore, the document holder (h) is pivoted on a pivot that is a rear side portion of the scanner portion (f) so as to be openable and closable. On the other hand, the locking member 31 is disposed at a corner portion of the document holder (h) on the front side thereof so as to project downward.

Further, the locking device 30 includes a hook member 32 (first hook member) provided in the scanner portion (f) as shown in FIG. 10 and FIG. 11. The hook member 32 is engageable with the locking member 31 inserted in the opening 12, below the document placing surface 11. The locking member 31 has a through hole 31a that passes therethrough in a direction orthogonal to the projection direction. The hook member 32 is inserted into the through hole 31a, thereby engaging with the locking member 31, as shown in FIG. 11. Thus, when the hook member 32 engages with the locking member 31, the document holder (h) is locked so as to prevent the document holder (h) from performing opening operation relative to the scanner portion (f). Namely, the document holder (h) is locked so as not to open relative to the scanner portion (f).

Further, the locking device 30 includes a lid member 33. The lid member 33 is movable between a closing position (see FIG. 7) at which the opening 12 is closed and an opening position (see FIG. 8) at which the opening 12 is opened by the lid member 33 moving downward of the document placing surface 11. The lid member 33 is almost T-shaped as shown in FIG. 6, and is slidable, in the up-down direction, relative to a frame 21, of the opening and closing operation locking unit 20, which is fixed to the scanner portion (f). The upper portion of the lid member 33 is flat-plate-shaped, and has such a size as to close the opening 12 from below the opening 12.

Further, the locking device 30 includes a spring member 34 (first urging member) provided in the scanner portion (f), as shown in FIG. 7. The spring member 34 urges the lid member 33 from the opening position toward the closing position. The spring member 34 is disposed inside the frame 21, and urges the lid member 33 upward. Thus, the lid member 33 is movable from the closing position toward the opening position against an urging force by being pressed by the locking member 31, as shown in FIG. 8. Moreover, when pressing by the locking member 31 is removed, the lid member 33 can be automatically moved upward from the opening position toward the closing position due to an urging force by the spring member 34, as shown in FIG. 7. A force by the spring member 34 may be low when the lid member 33 can be pressed upward by the force.

The locking member 31 that can contact with the lid member 33 is provided so as to be movable between a projecting position (see FIG. 7 and FIG. 8) at which the locking member 31 projects from the document holder (h) and a retracting position (see FIG. 28) at which the locking member 31 retracts into the document holder (h). The locking member 31 is provided so as to be able to be extracted from and retracted into an opening 15 formed in the document holder (h). A base end portion 31b of the locking member 31 is formed so as to be greater than the width of the opening 15, and can be stopped on the reverse inner side of the opening 15, as shown in FIG. 7. Thus, the locking member 31 is allowed to project on the bottom surface side of the document holder (h) without dropping from the document holder (h).

Figure 28:
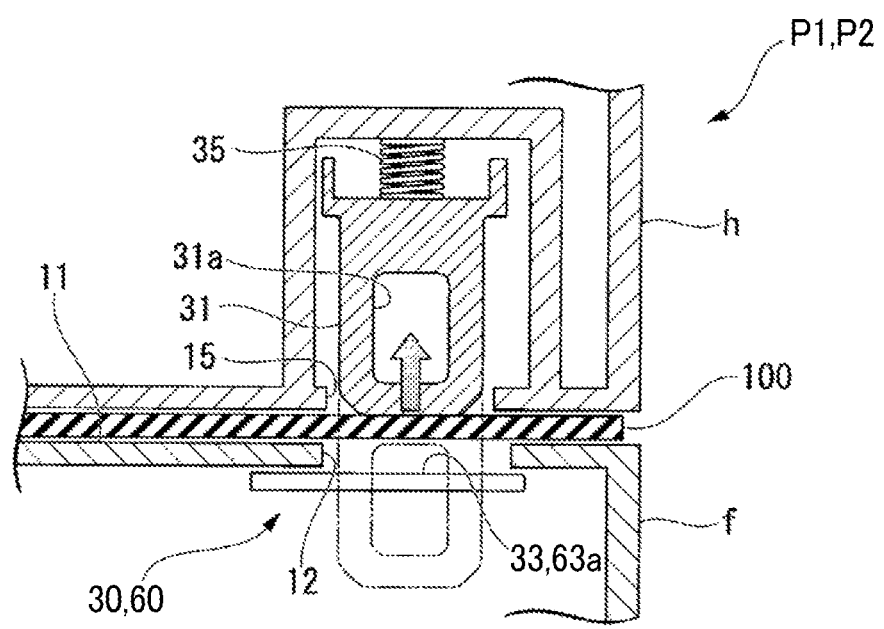
FIG. 28 illustrates an action of the locking member according to the first embodiment and the second embodiment of the present disclosure.

Further, the locking device 30 includes a spring member 35 (second urging member) provided in the document holder (h). The spring member 35 urges the locking member 31 from the retracting position toward the projecting position. The spring member 35 is provided inside the opening 15, and urges the locking member 31 downward. Thus, when a foreign object 100 such as a document is sandwiched between the locking member 31 and the opening 12, the locking member 31 can retract into the document holder (h) against an urging force of the spring member 35, as shown in FIG. 28. Further, in a normal state, the locking member 31 is urged by the spring member 35 to automatically project from the document holder (h) as shown in FIG. 7 and FIG. 8. The spring member 35 has an urging force that is higher than an urging force of the spring member 34 by which the lid member 33 is pressed upward, such that the locking member 31 does not yield to a pressing force of the lid member 33.

The hook member 32 is engageable with the locking member 31. The hook member 32 is provided so as to be movable between a first engaging position (see FIG. 11) at which the hook member 32 engages with the locking member 31 and a first disengaging position (see FIG. 10) at which the hook member 32 is disengaged from the locking member 31. The hook member 32 has a pivot 32a, and is pivotable about the pivot 32a. The pivot 32a is held by the frame 21 of the opening and closing operation locking unit 20 so as to be rotatable as shown in FIG. 5 and FIG. 6. When the hook member 32 is positioned at the first disengaging position shown in FIG. 10, the hook member 32 retracts from a moving path of the lid member 33. On the other hand, when the hook member 32 is positioned at the first engaging position shown in FIG. 11, the hook member 32 projects into the moving path of the lid member 33 to engage with the through hole 31a of the locking member 31.

Further, the locking device 30 includes a spring member 36 (third urging member) provided in the scanner portion (f), a projection 37 provided in the apparatus body 10, and a linking member 38 provided in the scanner portion (f). The spring member 36 urges the hook member 32 from the first disengaging position toward the first engaging position. In a state where the scanner portion (f) is closed relative to the apparatus body 10, the linking member 38 contacts with the projection 37 to move the hook member 32 from the first engaging position to the first disengaging position against an urging force of the spring member 36. The spring member 36 is disposed inside the frame 21, and urges an end portion 32b that is opposite to the hook-shaped portion of the hook member 32 with respect to the pivot 32a.

The projection 37 stands on a surface of the apparatus body 10 on which the scanner portion (f) is mounted, and has a column-like shape and a flat top surface. The projection 37 can be inserted into the scanner portion (f) through an opening 16 formed on the bottom surface of the scanner portion (f). The linking member 38 is bent so as to be almost L-shaped. The linking member 38 has a pivot 38a, and is pivotable about the pivot 38a. The pivot 38a is held by the frame 21 of the opening and closing operation locking unit 20 so as to be rotatable as shown in FIG. 5 and FIG. 6. One end portion of the linking member 38 can contact with the hook member 32 on a side, of the hook member 32, opposite to a side on which the spring member 36 contacts with the end portion 32b of the hook member 32 as shown in FIG. 10. On the other hand, the other end portion of the linking member 38 can contact with the top end of the projection 37.

Thus, in a state where the scanner portion (f) is closed relative to the apparatus body 10, the hook member 32 moves to the first disengaging position against an urging force of the spring member 36 by the linking member 38 contacting with the projection 37, as shown in FIG. 10. On the other hand, in a state where the scanner portion (f) is open relative to the apparatus body 10, the hook member 32 presses back the linking member 38 that no longer contacts with the projection 37, to automatically move from the first disengaging position to the first engaging position, as shown in FIG. 11. Therefore, in a state where the scanner portion (f) is closed relative to the apparatus body 10, the document holder (h) is unlocked, whereas when the scanner portion (f) is open relative to the apparatus body 10, the document holder (h) is locked.

The locking device 40 locks the scanner portion (f) so as to prevent the scanner portion (f) from performing opening operation. The locking device 40 is provided in the scanner portion (f). The locking device 40 includes hook members 41 (second hook member) as shown in FIG. 7 and FIG. 8. The hook members 41 are movable between a second engaging position at which the hook members 41 engage with the apparatus body 10 and a second disengaging position at which the hook members 41 are disengaged from the apparatus body 10. Each hook member 41 is engageable with an engaging portion 17 provided in the apparatus body 10. The engaging portion 17 is provided in the apparatus body 10 below the surface on which the scanner portion (f) is mounted. The hook members 41 are rotatable about a rotation shaft 41a as shown in FIG. 8. The rotation shaft 41a is urged by a not-illustrated torsion coil spring or the like in a rotation direction in which the hook members 41 are locked.

Figure 9:
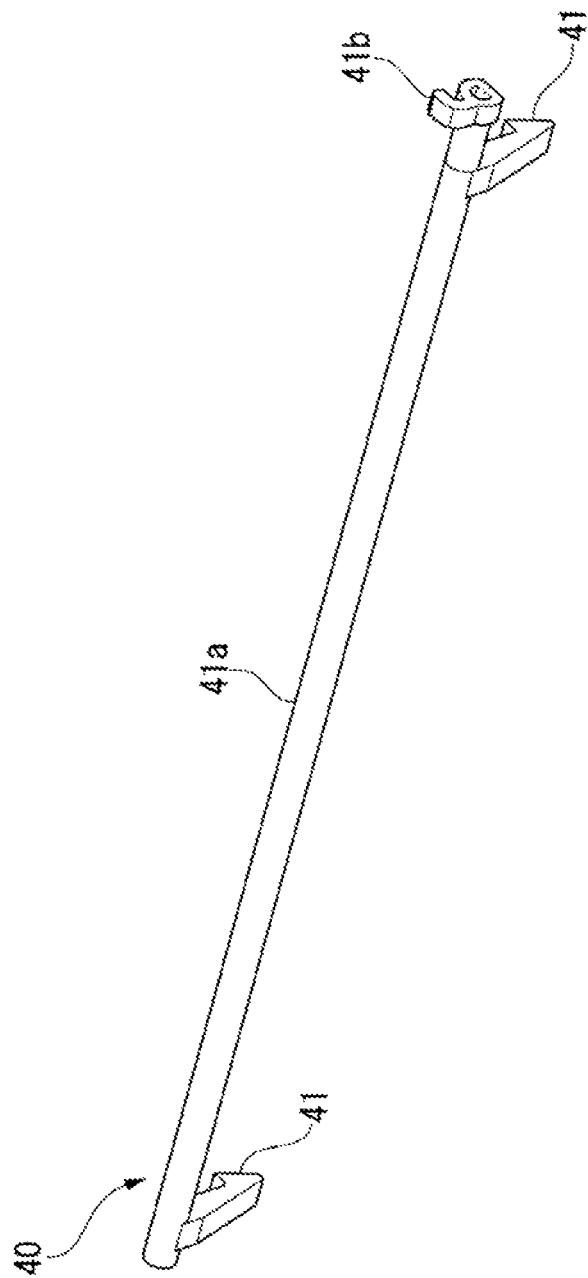
FIG. 9 is a perspective view illustrating an external appearance of a second hook member according to the first embodiment of the present disclosure.

The hook members 41 are provided in both end portions, respectively, of the rotation shaft 41a so as to integrally rotate, as shown in FIG. 9. The rotation shaft 41a extends in the width direction of the scanner portion (f), and the scanner portion (f) is engageable with the apparatus body 10 by means of the two hook members 41. An arm member 41b is mounted at one end of the rotation shaft 41a. The arm member 41b has almost an L-shaped hook-like shape. The arm member 41b is disposed below the lid member 33 as shown in FIG. 6. Namely, one end of the rotation shaft 41a passes through the frame 21 of the opening and closing operation locking unit 20, and is held so as to be rotatable.

Further, the locking device 40 includes a regulation portion 42 as shown in FIG. 7. When the lid member 33 is positioned at the closing position, the regulation portion 42 prevents movement of the hook members 41 to the second disengaging position (see FIG. 7). On the other hand, when the lid member 33 is positioned at the opening position, the regulation portion 42 releases prevention of movement of the hook members 41 to the second disengaging position (see FIG. 8). The regulation portion 42 is integrated with the lid member 33, and is slidable upward and downward integrally with the lid member 33. A space is formed in a region reverse of the lower end portion of the lid member 33, to prevent the lid member 33 from interfering with the arm member 41b in the up-down direction (see FIG. 6 to FIG. 8).

The regulation portion 42 is shaped so as to project inward in the lower end portion of the lid member 33. When the lid member 33 is positioned at the closing position, the regulation portion 42 faces the head of the arm member 41b to prevent rotation of the hook members 41 as shown in FIG. 7. On the other hand, when the lid member 33 is positioned at the opening position, the regulation portion 42 does not face the head of the arm member 41b to cancel the prevention of rotation of the hook members 41 as shown in FIG. 8.

Further, as shown in FIG. 8, the locking device 40 includes a hooking cancellation button 43 by which engagement by the hook members 41 is canceled. The hooking release button 43 is a member that is almost L-shaped, and is provided so as to be slidable along the bottom surface of the scanner portion (f). The hooking release button 43 has a front surface portion 43a (see FIG. 3) that is exposed on the front surface of the scanner portion (f), and an end portion 43b by which the hook member 41 is pressed inward and disengaged from the engaging portion 17. As shown in FIG. 7, when movement of the hook members 41 is prevented by the regulation portion 42, the hooking release button 43 cannot be pressed inward. Therefore, in a state where the document holder (h) is not closed (when the document holder (h) cannot be locked), the scanner portion (f) can be prevented from performing opening operation.

Subsequently, an opening and closing operation of the scanner portion (f) in the multifunction peripheral P1 having the above structure will be described.

A user firstly closes the document holder (h) that is provided so as to be openable and closable relative to the scanner portion (f), as shown in FIG. 1. When the document holder (h) has been closed, the locking member 31 shown in FIG. 4 is inserted into the opening 12 shown in FIG. 3. The opening 12 is formed so as to be coplanar with the document placing surface 11, and is closed by the lid member 33 as shown in FIG. 7. The lid member 33 is pressed by the locking member 31 to move from the closing position to the opening position against an urging force of the spring member 34 (see FIG. 8). When the lid member 33 is moved downward, the regulation portion 42 formed in the lid member 33 is also moved downward. As shown in FIG. 8, when the lid member 33 is positioned at the opening position, the regulation portion 42 does not face the arm member 41b. Thus, prevention of rotation of the hook members 41 is released to allow the user to press the hooking release button 43 inward.

Next, the user presses inward the hooking release button 43 that is exposed on the front surface of the scanner portion (f) as shown in FIG. 3. When the hooking release button 43 is pressed inward, the end portion 43b of the hooking release button 43 disengages the hook members 41 and the engaging portions 17 from each other as shown in FIG. 8. When the hook members 41 are disengaged from the engaging portions 17 due to the hooking release button 43 being pressed inward, locking (locking by the locking device 40) of the scanner portion (f) for preventing the scanner portion (f) from performing opening operation relative to the apparatus body 10 is released, so that the scanner portion (f) is allowed to open relative to the apparatus body 10.

Next, the user opens the scanner portion (f) provided so as to be openable and closable relative to the apparatus body 10, as shown in FIG. 27. When the scanner portion (f) is opened, the contact between the projection 37 and the linking member 38 is released as shown in FIG. 11. The linking member 38 that no longer contacts with the projection 37 is pressed back by the hook member 32 that is urged by the spring member 36. The hook member 32 that has pressed the linking member 38 back, automatically rotates from the first disengaging position toward the first engaging position due to an urging force of the spring member 36.

The hook member 32 that rotates toward the first engaging position is inserted into the through hole 31a to engage with the locking member 31. When the hook member 32 engages with the locking member 31, the document holder (h) is locked (locked by the locking device 30) so as to prevent the document holder (h) from performing opening operation relative to the scanner portion (f).

Thus, in a case where the document holder (h) is locked so as to prevent the document holder (h) from performing opening operation relative to the scanner portion (f), when the scanner portion (f) is opened, the document holder (h) does not open, as shown in FIG. 27. Therefore, the center of gravity of the entirety of the multifunction peripheral P1 does not shift rearward, so that the apparatus body 10 can be assuredly prevented from falling.

As described above, in the present embodiment, the scanner portion (f) has the opening 12, the locking member 31 provided in the document holder (h) is inserted into the opening 12, and the hook member 32 is engaged with the locking member 31 below the document placing surface 11, thereby locking the document holder (h) so as to prevent the document holder (h) from performing opening operation. In the opening 12 formed so as to be coplanar with the document placing surface 11, the lid member 33 is provided and can close the opening 12 before the locking member 31 is inserted thereinto. Therefore, as shown in FIG. 3, even when the opening 12 is formed on the front side so as to easily access the opening 12 due to space saving or the like, damage caused by an end portion of a document falling into the opening 12 can be prevented, or a foreign object (paper scraps, dust, or the like) can be prevented from entering the apparatus through the opening 12.

Further, in the present embodiment, the scanner portion (f) includes the spring member 34, to urge the lid member 33 toward the closing position. Therefore, when the document holder (h) is closed, the locking member 31 presses the lid member 33 downward, to open the opening 12, whereas when the document holder (h) is opened, pressing by the locking member 31 is released, to move the lid member 33 upward and automatically close the opening 12. Thus, when the document holder (h) is opened, the opening 12 is always closed to assuredly prevent the end portion of the document from falling or prevent a foreign object from entering.

Further, in order to prevent a document or the like from being caught by the locking member 31 due to, for example, the opening 12 being formed on the front side so as to easily access the opening 12, the following structure is adopted.

Namely, the locking member 31 is provided so as to be movable between the projecting position at which the locking member 31 projects from the document holder (h), and the retracting position at which the locking member 31 retracts into the document holder (h). In this structure, as shown in FIG. 28, even when a foreign object (a document, a sheet member, a plate member, or the like) 100 is placed over the opening 12, the locking member 31 is allowed to retract into the document holder (h), thereby preventing damage. Thus, when a foreign object is caught by the locking member 31 while the locking member 31 is being inserted into the opening 12, the locking member 31 moves from the projecting position to the retracting position against an urging force of the spring member 35. Therefore, in this structure, damage such as piercing or tearing of the foreign object 100 can be prevented, or damage of the locking member 31 itself can be prevented when the foreign object 100 is hard.

Further, in the present embodiment, by means of the hook member 32, the spring member 36, or the like, when the scanner portion (f) is opened, the document holder (h) is automatically locked so as to prevent the document holder (h) from performing opening operation, and when the scanner portion (f) is closed, the document holder (h) is unlocked and allowed to perform opening operation. In this structure, in a normal usage state in which the scanner portion (f) does not perform opening operation, locking of the document holder (h) for preventing the document holder (h) from performing opening operation relative to the scanner portion (f) can be prevented from being unintentionally performed, as shown in FIG. 10.

Further, in the present embodiment, when the lid member 33 is positioned at the closing position, release of locking of the scanner portion (f) for preventing the scanner portion (f) from performing opening operation relative to the apparatus body 10 is prevented by means of the hook members 41, the regulation portion 42, or the like, whereas when the lid member 33 is positioned at the opening position, prevention of movement of the hook members 41 is released, to cancel locking of the scanner portion (f) for preventing the scanner portion (f) from performing opening operation relative to the apparatus body 10. In this structure, as shown in FIG. 7, in a state where the document holder (h) is not closed (the document holder (h) cannot be locked), the scanner portion (f) can be prevented from performing opening operation. Therefore, a state where the document holder (h) is unlocked to open when the scanner portion (f) is opened, can be prevented, thereby more assuredly preventing the apparatus body 10 from falling.

Since the multifunction peripheral P1 is thus structured, the document holder (h) can be prevented from being inclined and the apparatus body 10 can be prevented from falling in a simple structure even in a space that is limited, for example, due to its height being designed to be reduced, or due to space saving. Further, the multifunction peripheral P1 can be provided which can prevent tearing of a document caused by a projection (the locking member 31) of the locking device 30, and entering of a foreign object through the opening 12.

Second Embodiment

Figure 12:
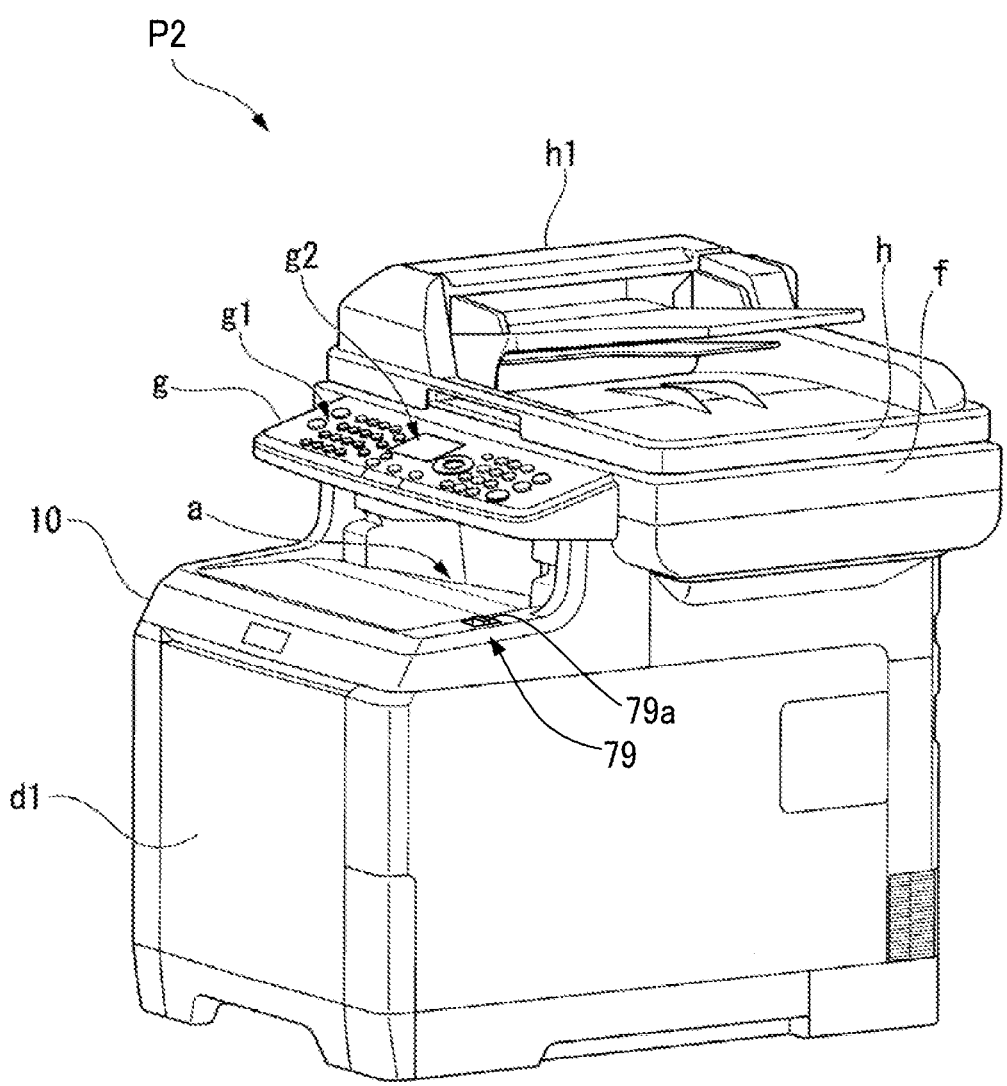
FIG. 12 is a perspective view illustrating an external appearance of a multifunction peripheral according to the second embodiment of the present disclosure.

Hereinafter, the second embodiment of the present disclosure will be described. FIG. 12 is a perspective view illustrating an external appearance of a multifunction peripheral P2 according to the second embodiment of the present disclosure. As shown in FIG. 2, the multifunction peripheral P2 (image forming apparatus) includes the same components as those of the multifunction peripheral P1 according to the first embodiment described above. Namely, the multifunction peripheral P2 includes the apparatus body 10, the discharge portion (a), the toner storage portion (b), the image forming portion (c), and the sheet portion (d). Further, the multifunction peripheral P2 includes the conveying portion (e) that extends from the sheet portion (d) that is located in a lower portion to the discharge portion (a) that is located in an upper portion. Further, the multifunction peripheral P2 includes the scanner portion (f) (document reading device), the operation portion (g), and the document holder (h) on and above the discharge portion (a). In the description for the second embodiment, the same components and mechanisms as described for the first embodiment are denoted by the same reference numerals as used in the first embodiment, and the description of the same components and mechanisms is not given.

Figure 18:
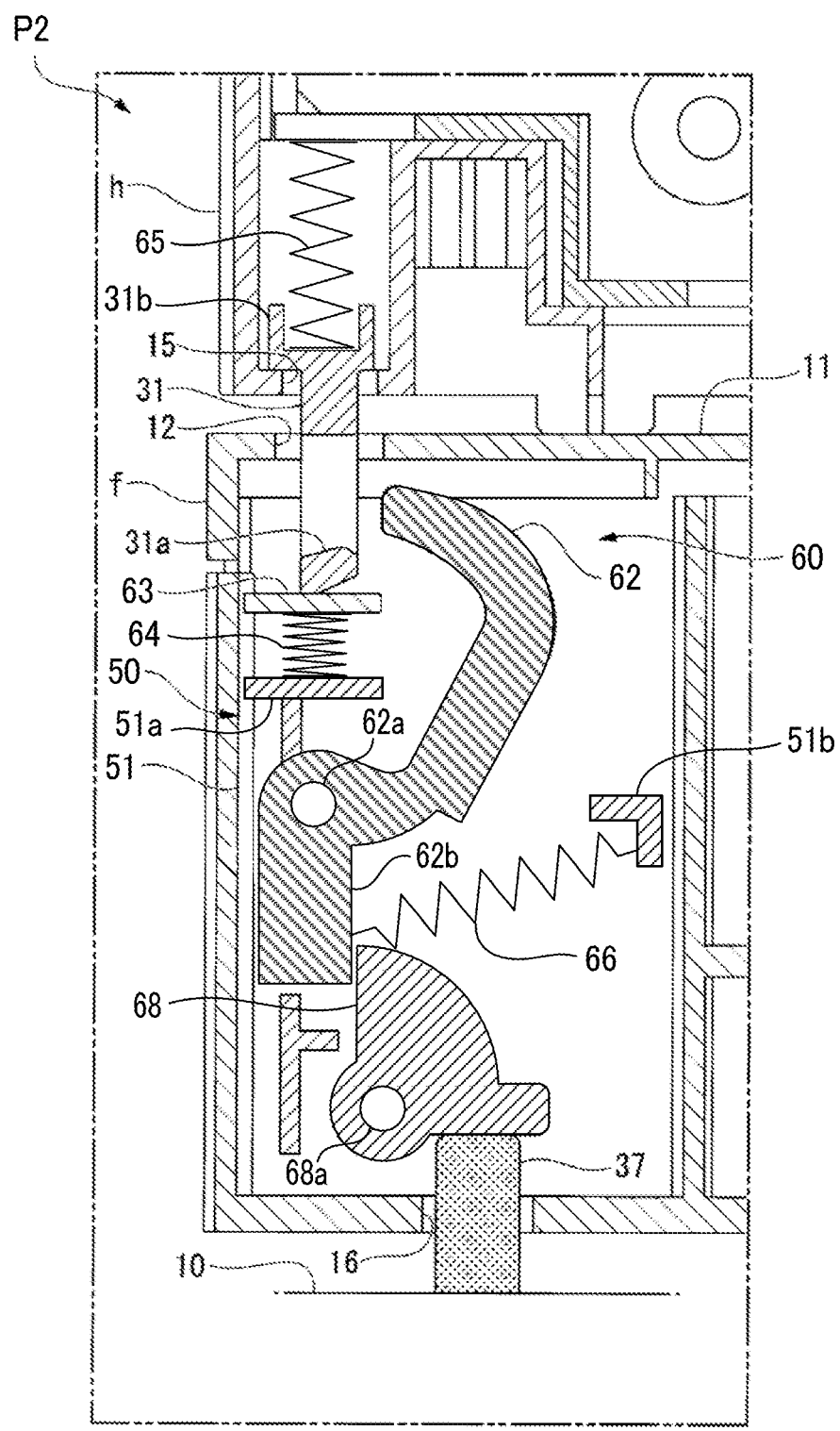
FIG. 18 is a cross-sectional view illustrating an internal structure of the first locking device according to the second embodiment of the present disclosure, and illustrates the unlocked state of the locking member.
Figure 19:
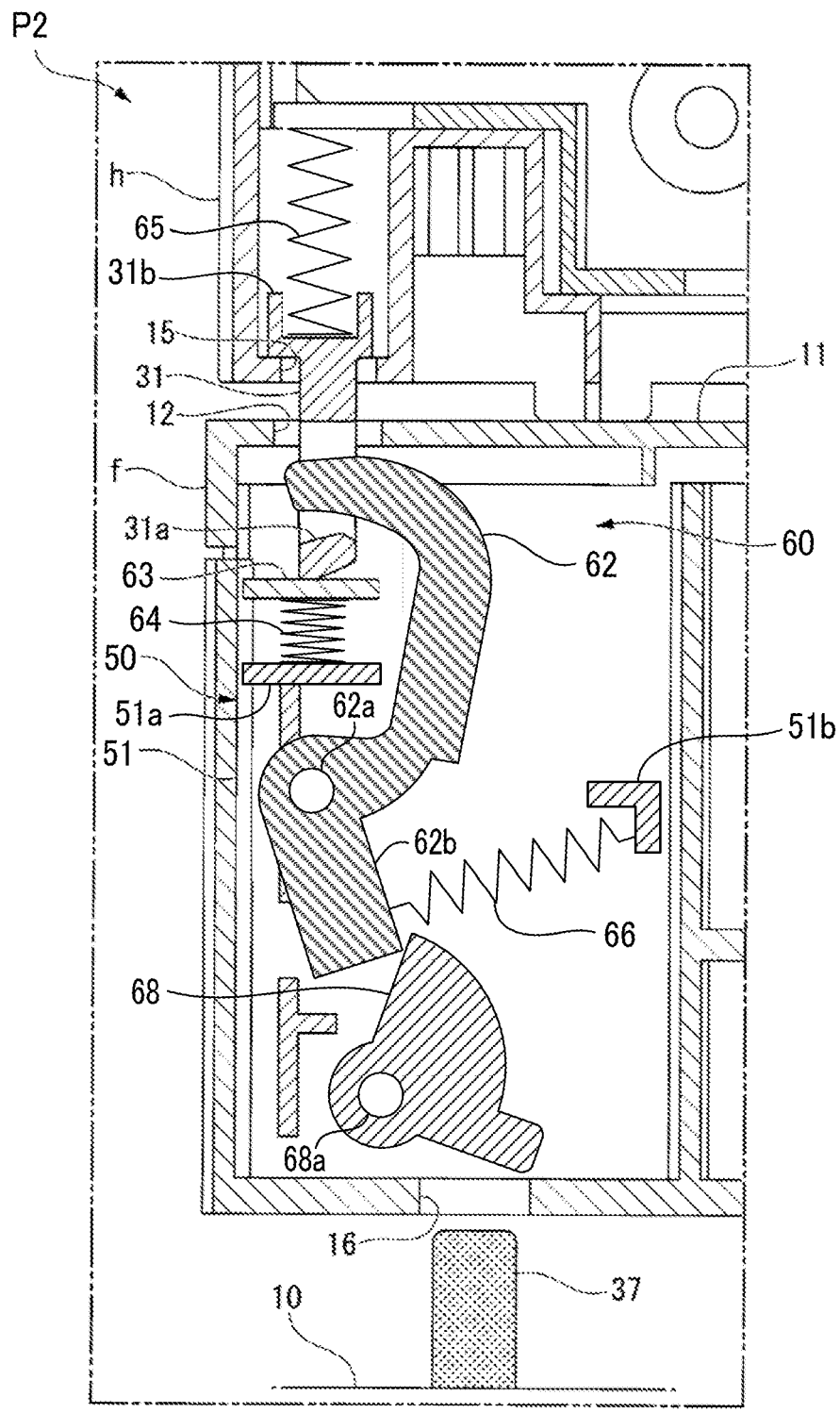
FIG. 19 is a cross-sectional view illustrating an internal structure of the first locking device according to the second embodiment of the present disclosure, and illustrates the locked state of the locking member.

Next, with reference to FIG. 13 to FIG. 28, a structure of an opening and closing operation locking unit 50, for the scanner portion (f) and the document holder (h), which is included in the multifunction peripheral P2 will be described in detail. FIG. 18 illustrates an unlocked state in which locking by a locking device 60 is released. FIG. 19 illustrates a locked state in which locking by the locking device 60 is performed. FIG. 25A and FIG. 26A are each a perspective view of a lever member 79. FIG. 25B and FIG. 26B are each a top view of the lever member 79. In the below description, in the opening and closing operation locking unit 50, the same components and mechanisms as those of the opening and closing operation locking unit 20 according to the first embodiment described above are denoted by the same reference numerals as used in the first embodiment, and description of the same components and mechanisms is not given. Description of mounting positions, shapes, and operations of the same components and mechanisms as those of the opening and closing operation locking unit 20 according to the first embodiment is not given.

As described above, the document holder (h) is provided so as to be openable and closable relative to the scanner portion (f). Further, the scanner portion (f) is provided so as to be openable and closable relative to the apparatus body 10 as shown in FIG. 27.

The opening and closing operation locking unit 50 includes the locking device 60 (first locking device) that locks the document holder (h) so as to prevent the document holder (h) from performing opening operation relative to the scanner portion (f), and a locking device 70 (third locking device) that locks the scanner portion (f) so as to prevent the scanner portion (f) from performing opening operation relative to the apparatus body 10. The opening and closing operation locking unit 50 is structured as a unit having a mechanism in which the locking device 60 and the locking device 70 operate in conjunction with each other (see FIG. 16 and FIG. 17).

Figure 13:
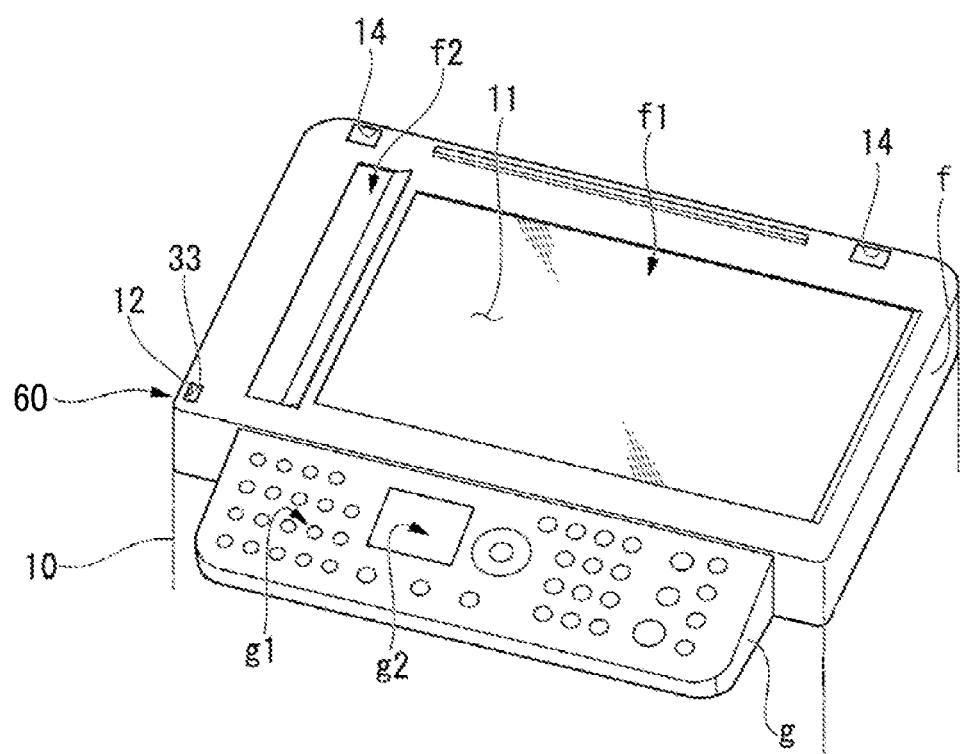
FIG. 13 is a perspective plan view illustrating an external appearance of a scanner portion according to the second embodiment of the present disclosure.

The locking device 60 locks the document holder (h) so as to prevent the document holder (h) from performing opening operation when the scanner portion (f) performs opening. As shown in FIG. 13, the scanner portion (f) has the opening 12 used for locking the document holder (h) so as to prevent the document holder (h) from performing opening operation. The opening 12 is formed so as to be coplanar with the document placing surface 11 on which a document is placed.

Figure 14:
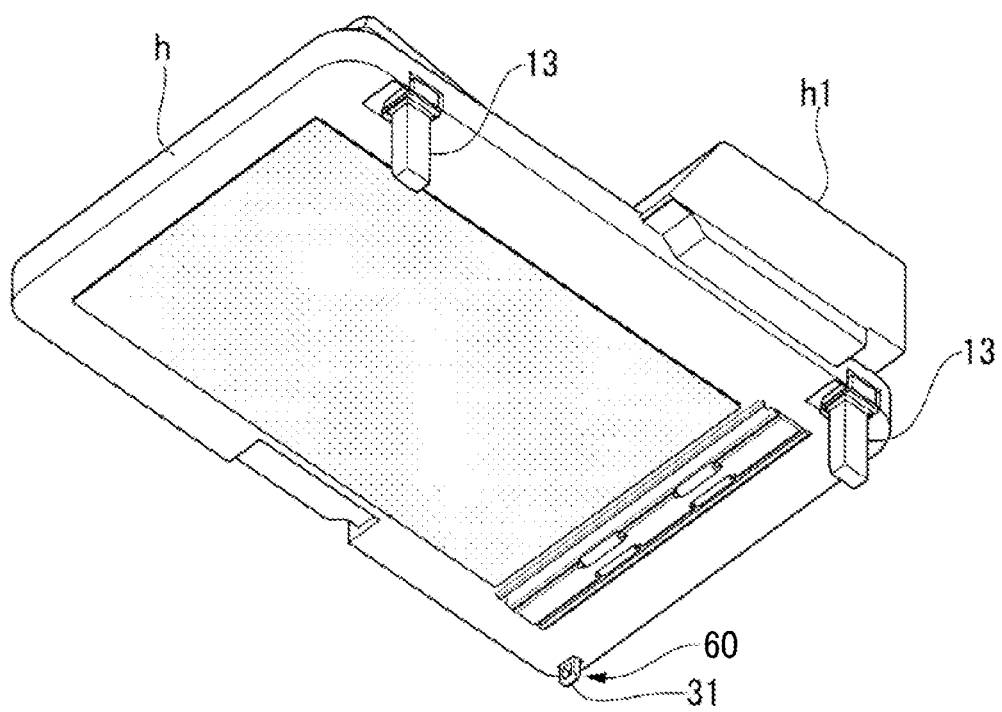
FIG. 14 is a perspective bottom view illustrating an external appearance of a document holder according to the second embodiment of the present disclosure.
Figure 15:
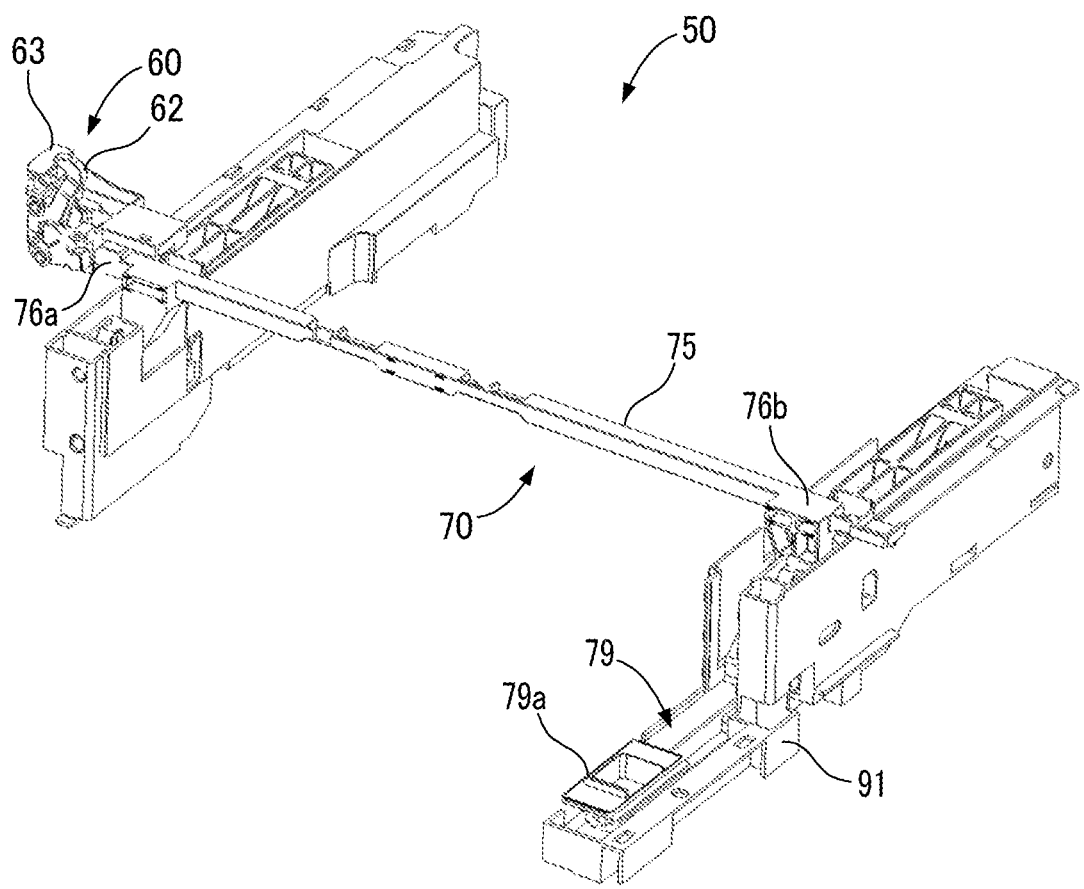
FIG. 15 is a perspective view illustrating a structure of an opening and closing operation locking unit according to the second embodiment of the present disclosure.

The locking device 60 includes the locking member 31 provided in the document holder (h) as shown in FIG. 14. The locking member 31 can be inserted into the opening 12 in a state where the document holder (h) is closed relative to the scanner portion (f).

Figure 16:
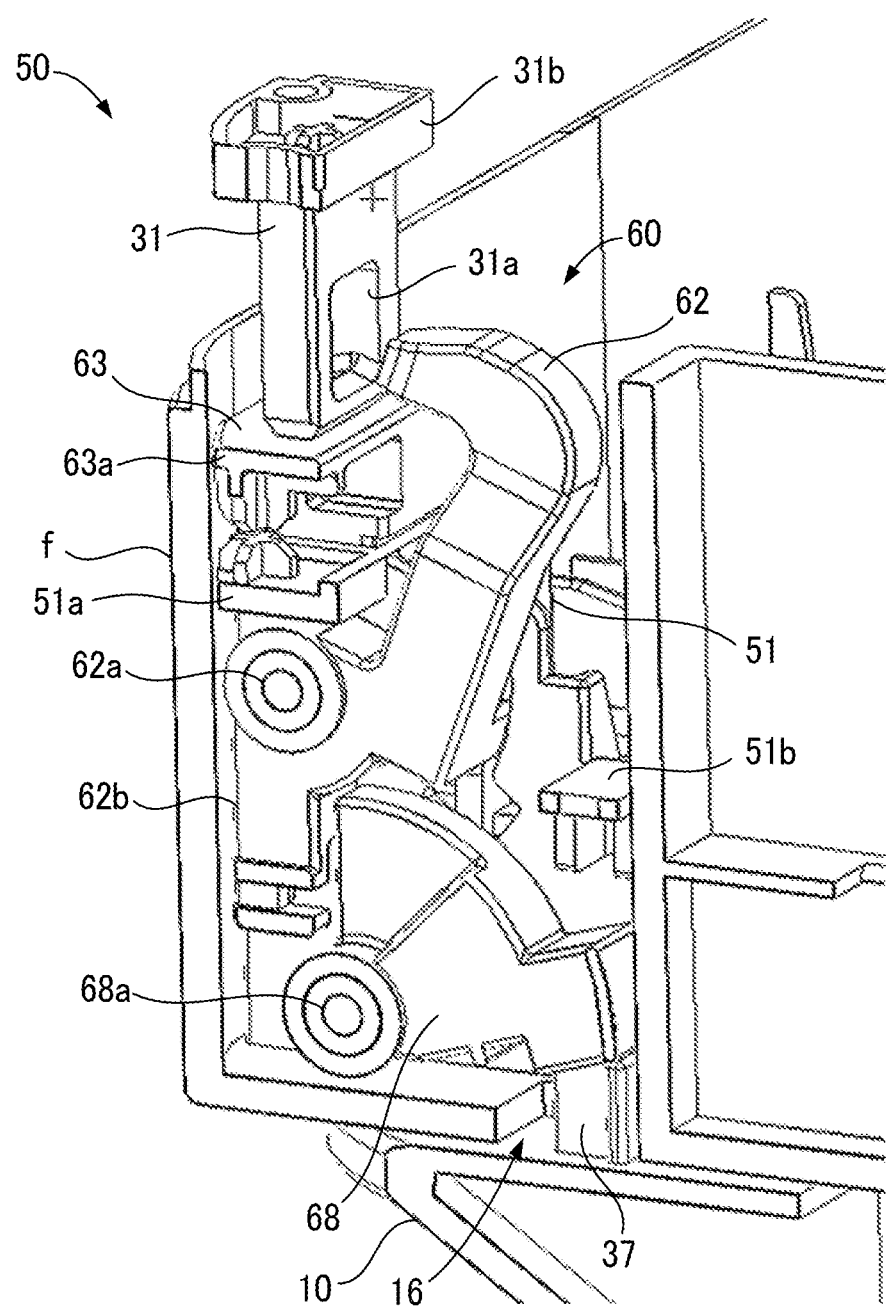
FIG. 16 is a perspective view illustrating an internal structure of a first locking device of the opening and closing operation locking unit according to the second embodiment of the present disclosure, and illustrates an unlocked state of a locking member.
Figure 17:
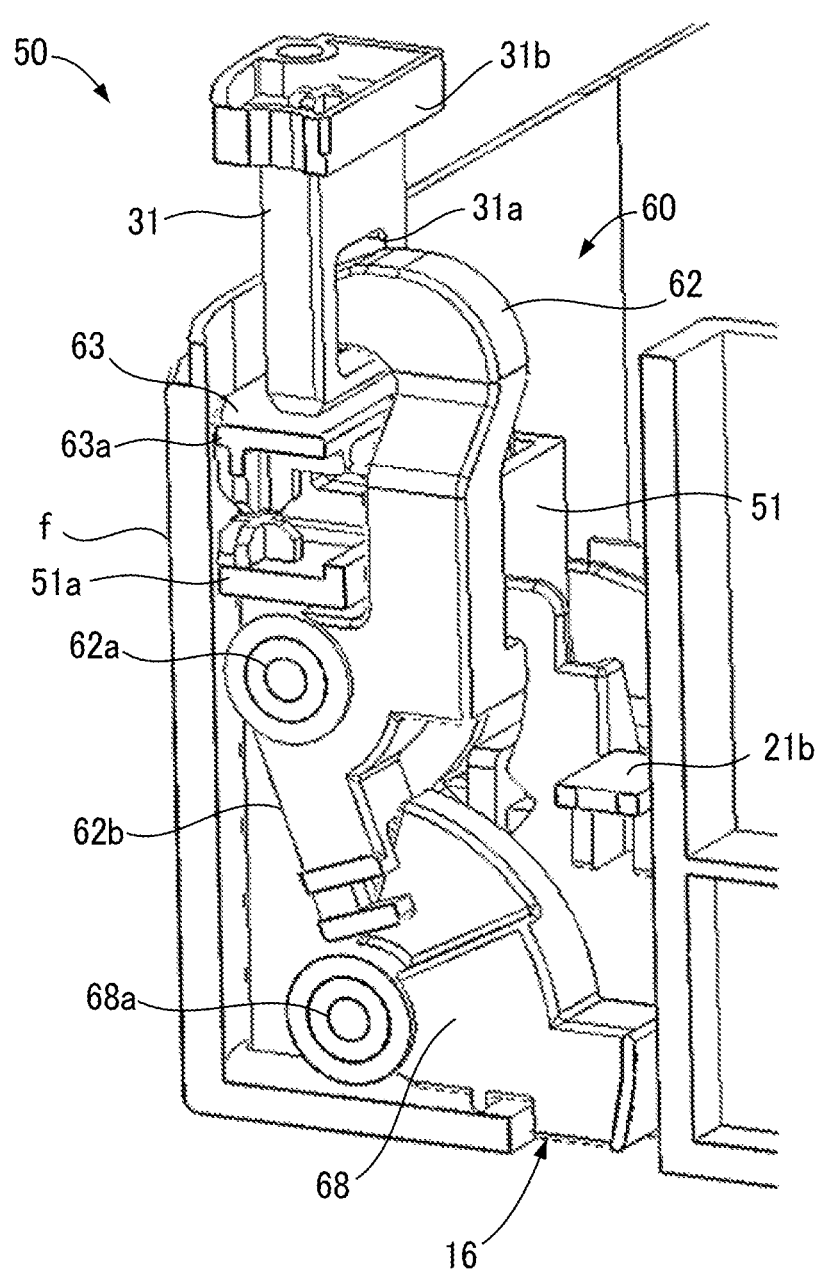
FIG. 17 is a perspective view illustrating an internal structure of the first locking device according to the second embodiment of the present disclosure, and illustrates a locked state of the locking member.

Further, the locking device 60 includes a hook member 62 (first hook member) provided in the scanner portion (f) as shown in FIG. 16 and FIG. 17. The hook member 62 is engageable with the locking member 31 inserted in the opening 12, below the document placing surface 11. The locking member 31 has the through hole 31a that passes therethrough in a direction orthogonal to the projection direction. The hook member 62 is inserted into the through hole 31a, thereby engaging with the locking member 31, as shown in FIG. 17. Thus, when the hook member 62 engages with the locking member 31, the document holder (h) is locked so as to prevent the document holder (h) from performing opening operation relative to the scanner portion (f). Namely, the document holder (h) is locked so as not to open relative to the scanner portion (f).

Further, the locking device 60 includes a movable member 63. The movable member 63 is movable between a closing position (see FIG. 16) at which the opening 12 is closed and an opening position (see FIG. 17) at which the opening 12 is opened by the movable member 63 moving downward of the document placing surface 11. The movable member 63 is slidable, in the up-down direction, relative to a frame 51, of the opening and closing operation locking unit 50, which is fixed to the scanner portion (f), as shown in FIG. 16. A lid portion 63a that is flat-plate-shaped is provided in the upper portion of the movable member 63. The lid portion 63a closes the opening 12 at the closing position, and the opening 12 is opened by the lid portion 63a being positioned at the opening position. The lid portion 63a has such a size as to close the opening 12 from below the opening 12.

Further, the locking device 60 includes a spring member 64 (fourth urging member) provided in the scanner portion (f), as shown in FIG. 18. The spring member 64 urges the movable member 63 from the opening position toward the closing position. The spring member 64 is disposed inside the frame 51, and urges the movable member 63 upward. Specifically, the spring member 64 is disposed between a spring seat 51a provided in the frame 51, and the lid portion 63a located above the spring seat 51a. Thus, the movable member 63 is movable from the closing position toward the opening position against an urging force of the spring member 64 by being pressed by the locking member 31. Moreover, when pressing by the locking member 31 is released, the movable member 63 can be automatically moved upward from the opening position toward the closing position due to an urging force of the spring member 64. A force by the spring member 64 may be low when the movable member 63 can be pressed upward by the force.

The locking member 31 that can contact with the movable member 63 is provided so as to be movable between a projecting position (see FIG. 18 and FIG. 19) at which the locking member 31 projects from the document holder (h) and a retracting position (see FIG. 28) at which the locking member 31 retracts into the document holder (h). The locking member 31 is provided so as to be able to be extracted from and retracted into the opening 15 formed in the document holder (h). The base end portion 31b of the locking member 31 is formed so as to be greater than the width of the opening 15, and can be stopped on the reverse inner side of the opening 15, as shown in FIG. 18. Thus, the locking member 31 is allowed to project on the bottom surface side of the document holder (h) without dropping from the document holder (h).

Further, the locking device 60 includes a spring member 65 (second urging member) provided in the document holder (h). The spring member 65 urges the locking member 31 from the retracting position toward the projecting position. The spring member 65 is provided inside the opening 15, and urges the locking member 31 downward. Thus, when a foreign object 100 such as a document is sandwiched between the locking member 31 and the opening 12, the locking member 31 can retract into the document holder (h) against an urging force of the spring member 65, as shown in FIG. 28. Further, in a normal state, the locking member 31 is urged by the spring member 65 to automatically project from the document holder (h) as shown in FIG. 18 and FIG. 19. The spring member 65 has an urging force that is higher than an urging force of the spring member 64 by which the movable member 63 is moved upward, such that the locking member 31 does not yield to a pressing force of the movable member 63.

The hook member 62 is engageable with the locking member 31. The hook member 62 is provided so as to be movable between a first engaging position (see FIG. 17 and FIG. 19) at which the hook member 62 engages with the locking member 31 and a first disengaging position (see FIG. 16 and FIG. 18) at which the hook member 62 is disengaged from the locking member 31. The hook member 62 has a pivot 62a, and is pivotable about the pivot 62a. The pivot 62a is held by the frame 51 of the opening and closing operation locking unit 50 so as to be rotatable as shown in FIG. 16 and FIG. 17. When the hook member 62 is positioned at the first disengaging position, the hook member 62 is retracted from a moving path of the movable member 63. On the other hand, when the hook member 62 is positioned at the first engaging position, the hook member 62 projects into the moving path of the movable member 63 to engage with the through hole 31a of the locking member 31.

As shown in FIG. 20A, the movable member 63 includes a body portion 63b. The body portion 63b is a member that has the lid portion 63a at the top thereof, extends downward from the lid portion 63a, and is elongated in the up-down direction. A lower end portion 63c of the body portion 63b includes an opening 63d into which an engagement piece 77 of a sliding member 75 described below can be inserted, and a regulation portion 63e that engages with the engagement piece 77 to prevent the sliding member 75 from sliding. The opening 63d and the regulation portion 63e are formed on the side surface of the lower end portion 63c of the movable member 63. The regulation portion 63e is disposed below the opening 63d, and contacts and engages with the engagement piece 77 from inside the movable member 63.

As shown in FIG. 20B, when the document holder (h) is closed and the movable member 63 is pressed by the locking member 31, the movable member 63 is positioned at the opening position. In this case, the engagement piece 77 can be inserted into and extracted from the opening 63d. Namely, the sliding member 75 is slidable in directions in which the sliding member 75 moves close to and away from the opening 63d. In other words, when the document holder (h) is closed relative to the scanner portion (f), the sliding member 75 is allowed to slide.

Figure 21A:
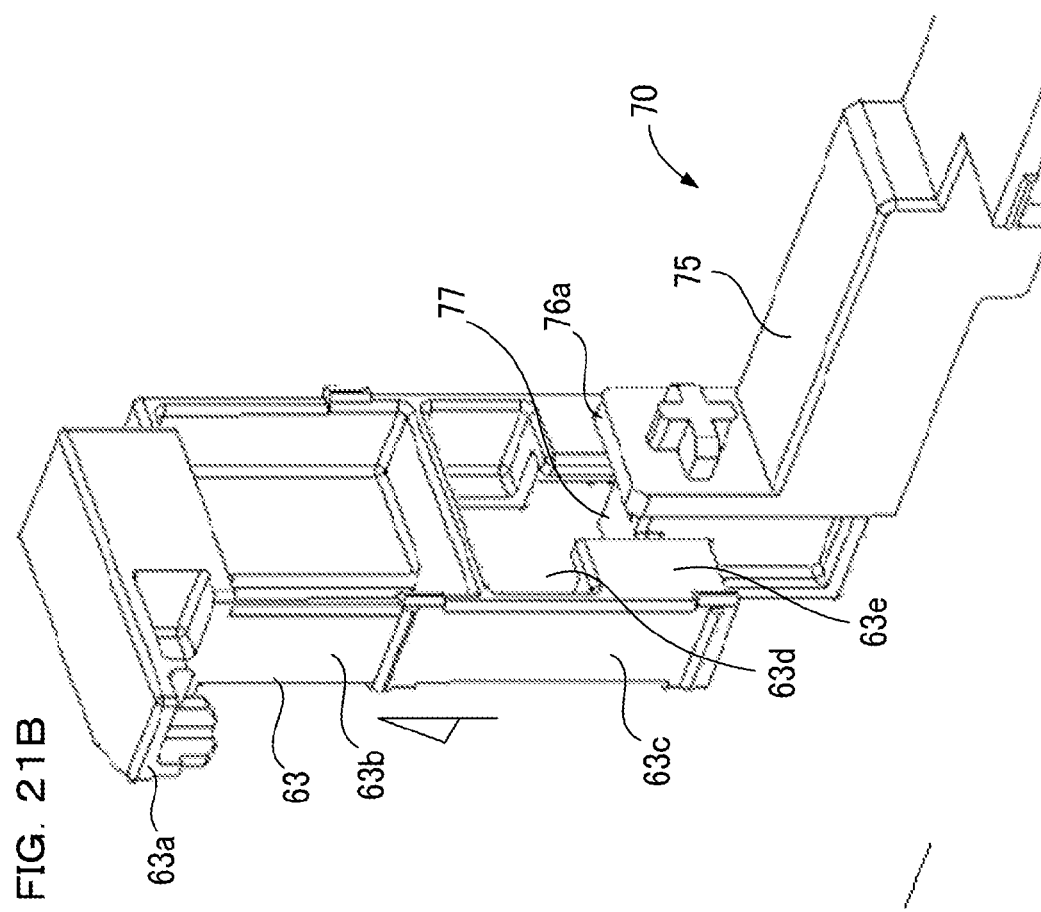
FIG. 21A and FIG. 21B are each a perspective view illustrating a structure and operation of the movable member according to the second embodiment of the present disclosure.
Figure 21B:
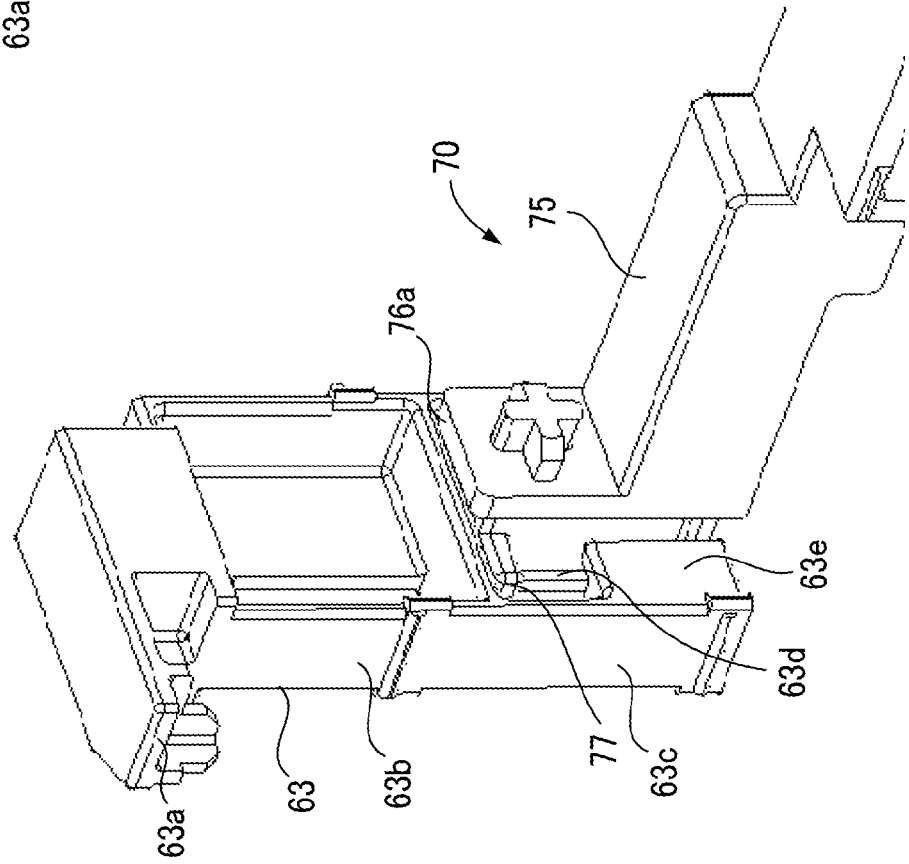

On the other hand, as shown in FIG. 21A, when the document holder (h) is opened, and pressing by the locking member 31 is released, the movable member 63 moves upward toward the closing position. When the movable member 63 moves upward in a state where the engagement piece 77 of the sliding member 75 remains inserted in the opening 63d, the position of the engagement piece 77 is shifted relatively downward and the engagement piece 77 reaches the regulation portion 63e, as shown in FIG. 21B. Namely, the regulation portion 63e moves upward according to the movement of the movable member 63, to reach a position at which the regulation portion 63e can engage with the engagement piece 77. In this state, the regulation portion 63e contacts and engages with the engagement piece 77, to prevent the engagement piece 77 from moving in a direction in which the engagement piece 77 moves away from the movable member 63. Namely, the regulation portion 63e engages with the engagement piece 77, to prevent the sliding member from sliding. In other words, when the document holder (h) is open relative to the scanner portion (f), the sliding member 75 is prevented from sliding from the position at which the engagement piece 77 engages with the regulation portion 63e.

As shown in FIG. 18 and FIG. 19, the locking device 60 includes a spring member 66 (third urging member) provided in the scanner portion (f), a projection 37 provided in the apparatus body 10, and a linking member 68 provided in the scanner portion (f). The spring member 66 urges the hook member 62 from the first disengaging position toward the first engaging position. The linking member 68 contacts with the projection 37 and moves the hook member 62 from the first engaging position to the first disengaging position against an urging force of the spring member 66 in a state where the scanner portion (f) is closed relative to the apparatus body 10. The spring member 66 is disposed between a support piece 51b provided in the frame 51 or the like, and an end portion 62b of the hook member 62. The end portion 62b is positioned opposite to the hook-shaped portion (a portion above the pivot 62a) of the hook member 62 with respect to the pivot 62a. The spring member 66 is a tension spring that connects between the support piece 51b and the end portion 62b, and draws the end portion 62b toward the support piece 51b, thereby urging the hook member 62 from the first disengaging position toward the first engaging position.

The linking member 68 includes a pivot 68a, and is pivotable about the pivot 68a. The pivot 68a is held by the frame 51 of the opening and closing operation locking unit 50 so as to be rotatable. One end portion of the linking member 68 can contact with a surface of the hook member 62 on a side on which the spring member 66 is connected to the end portion 62b of the hook member 62, as shown in FIG. 18. On the other hand, the other end portion of the linking member 68 can contact with the top of the projection 37.

Thus, the hook member 62 moves to the first disengaging position against an urging force of the spring member 66 by the linking member 68 contacting with the projection 37 in a state where the scanner portion (f) is closed relative to the apparatus body 10, as shown in FIG. 18. On the other hand, in a state where the scanner portion (f) is open relative to the apparatus body 10, the hook member 62 presses back the linking member 68 that no longer contacts with the projection 37, to automatically move from the first disengaging position toward the first engaging position, as shown in FIG. 19. Therefore, in a state where the scanner portion (f) is closed relative to the apparatus body 10, the document holder (h) is unlocked, whereas when the scanner portion (f) is open relative to the apparatus body 10, the document holder (h) is locked.

In the first embodiment described above, the locking device 40 is structured so as to engage the hook members 41 mounted on the rotation shaft 41a and the engaging portions 17 provided in the apparatus body 10 with each other. In this structure, the hook members 41 and the engaging portions 17 are disengaged from each other by the rotation shaft 41a being rotated. Therefore, in a case where an engaging force between the hook member 41 and the engaging portion 17 is high, when the rotation shaft 41a is rotated, the rotation shaft 41a may be distorted. In this case, the hook members 41 may not operate, and the hook members 41 and the engaging portions 17 may not be disengaged from each other. In particular, when the document feed device h1 is mounted to the document holder (h), the scanner portion (f) becomes heavy. In this case, a structure is used in which, for example, a damper or a spring is mounted to the hinge unit 19 to urge the scanner portion (f) in the opening direction in order to facilitate opening of the scanner portion (f) relative to the apparatus body 10. In this structure, an engaging force between the hook member 41 and the engaging portion 17 is enhanced, whereby the hook member 41 is likely to malfunction. Therefore, in the second embodiment, the locking device 70 is structured so as to assuredly release locking of the scanner portion (f) relative to the apparatus body 10.

Figure 22:
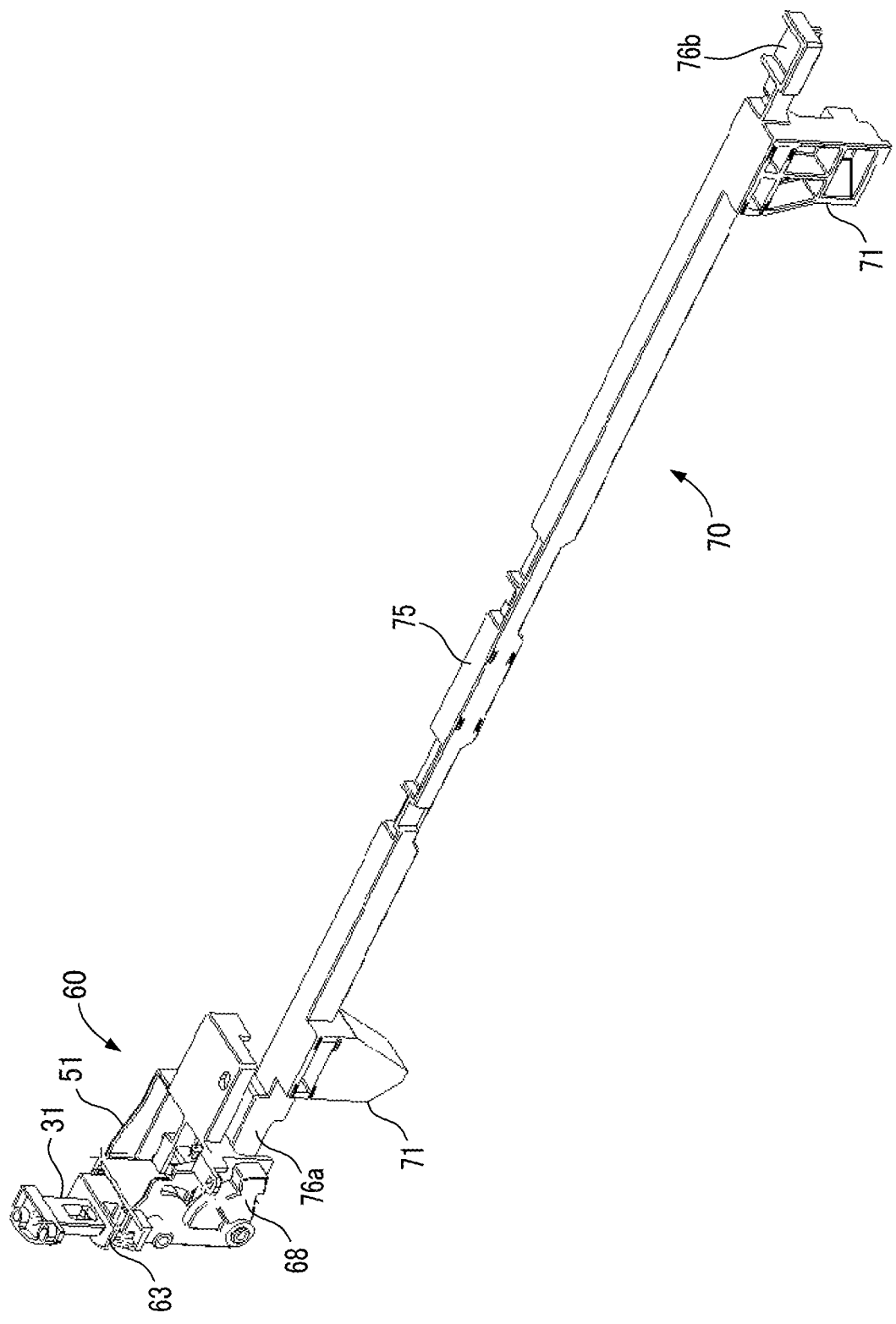
FIG. 22 is a perspective view illustrating a structure of a sliding member of a third locking device included in the opening and closing operation locking unit according to the second embodiment of the present disclosure.
Figure 23:
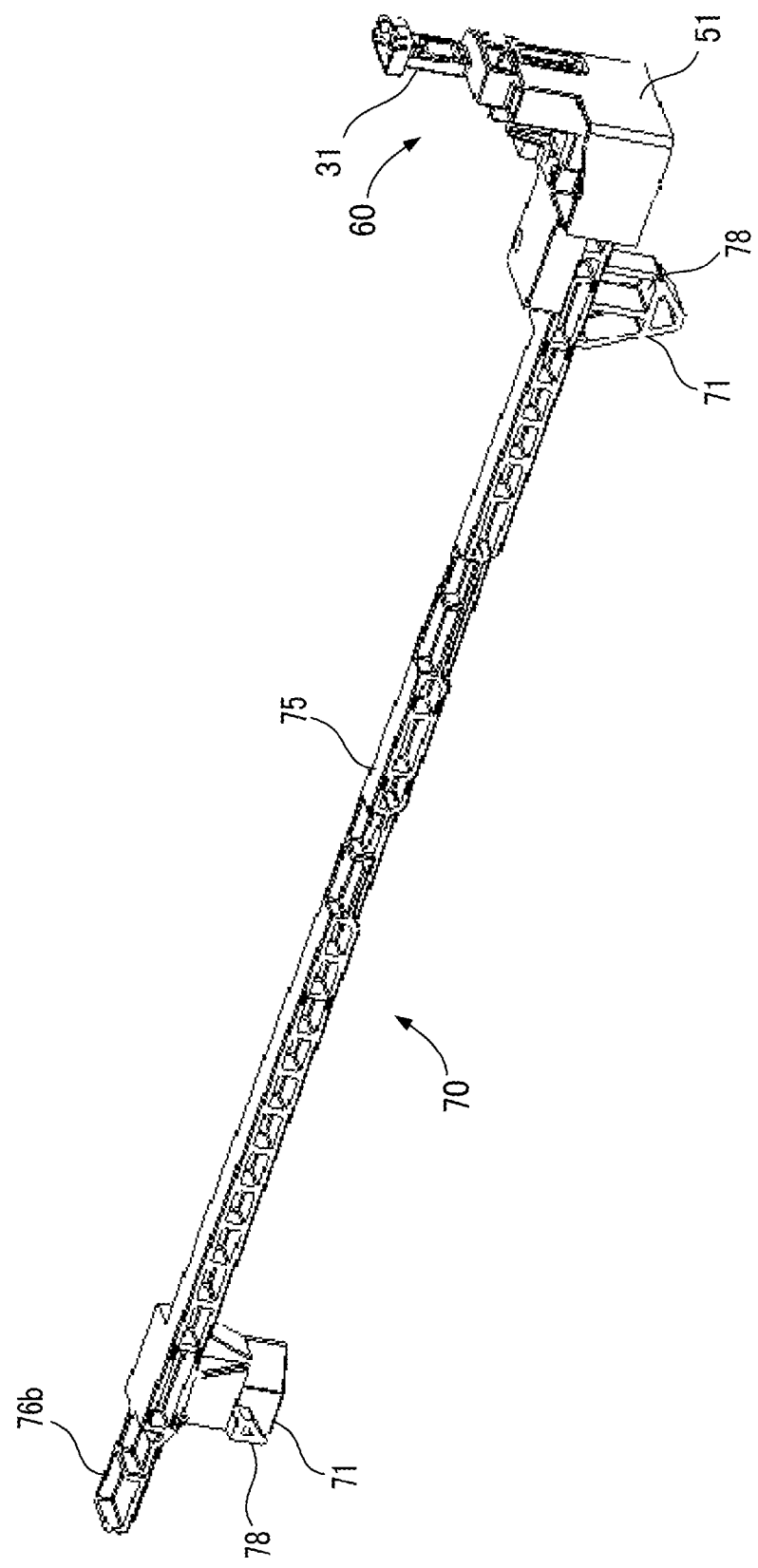
FIG. 23 is a perspective view illustrating a structure of the sliding member of the third locking device according to the second embodiment of the present disclosure.

The locking device 70 locks the scanner portion (f) so as to prevent the scanner portion (f) from performing opening operation. The locking device 70 is provided in the scanner portion (f). The locking device 70 includes the sliding member 75, hook members 71 (third hook member), and the engagement piece 77, as shown in FIG. 22 and FIG. 23. The sliding member 75 is structured as an elongated member, and is supported in the scanner portion (f) so as to be slidable in the longitudinal direction. Specifically, the sliding member 75 is provided so as to extend in the width direction of the scanner portion (f). The hook members 71 and the engagement piece 77 are integrated with the sliding member 75, and each of the hook members 71 and the engagement piece 77 are slid integrally with the sliding member 75. In the present embodiment, the locking device 70 is structured such that the scanner portion (f) is engageable with the apparatus body 10 by means of the two hook members 71.

The engagement piece 77 is provided in one end portion 76a of the sliding member 75. The engagement piece 77 passes through the frame 51 of the opening and closing operation locking unit 50, and engages with the lower end portion 63c of the movable member 63. A cam portion 74 is mounted in the other end portion 76b of the sliding member 75. The cam portion 74 operates in conjunction with an operation of the lever member 79 described below. Specifically, the cam portion 74 is provided so as to slide the sliding member 75 in conjunction with an operation of the lever member 79.

The number of the hook members 71 provided in the sliding member 75 is two. The hook members 71 are spaced from each other in the longitudinal direction of the sliding member 75, and project downward from the sliding member 75. The sliding member 75 is slidably supported so as to shift between a second engaging position and a second disengaging position described below. As shown in FIG. 23, each hook member 71 includes a hook-like portion 78 that is engageable with the apparatus body 10 in the up-down direction. The second engaging position is a position at which each hook-like portion 78 engages with the apparatus body 10. The second disengaging position is a position at which each hook-like portion 78 is disengaged from the apparatus body 10.

As shown in FIG. 24A, the engaging portions 17 are provided in the apparatus body 10 below a surface on which the scanner portion (f) is mounted. The hook members 71 are structured so as to be engageable with the engaging portions 17 in a state where the scanner portion (f) is closed relative to the apparatus body 10. Specifically, when the sliding member 75 is slid and positioned at the second engaging position, the hook-like portions 78 are positioned below the engaging portions 17 (see FIG. 24A). Thus, the hook members 71 and the engaging portions 17 engage with each other. Further, as shown in FIG. 24B, the sliding member 75 is slid and positioned at the second disengaging position, the hook-like portions 78 are disengaged from below the engaging portions 17. Thus, the hook members 71 and the engaging portions 17 are disengaged from each other.

Since the sliding member 75 is thus structured, when the movable member 63 is positioned at the opening position, engagement of the engagement piece 77 due to the regulation portion 63e is not performed, and the regulation portion 63e does not prevent the sliding member 75 from moving to the second disengaging position. On the other hand, when the movable member 63 is positioned at the closing position, the sliding member 75 is prevented from moving to the second disengaging position.

As shown in FIG. 27, on the rear side of the scanner portion (f), the hinge unit 19 is provided. The hinge unit 19 is mounted on the rear side of the apparatus body 10. Therefore, the scanner portion (f) can pivot on the rear side portion of the apparatus body 10 so as to be openable and closable. The hinge unit 19 includes an urging member such as a spring or a damper, which urges the scanner portion (f) in a direction in which the scanner portion (f) opens relative to the apparatus body 10. Therefore, in a state where the scanner portion (f) is closed relative to the apparatus body 10, the hinge unit 19 urges the scanner portion (f) in the opening direction. Thus, when engagement by the hook members 71 is released, the scanner portion (f) is urged by the hinge unit 19 and is held so as to be raised relative to the apparatus body 10. A user is allowed to visually check the raised state, thereby allowing the user to easily confirm that the scanner portion (f) is not engaged with the apparatus body 10.

Further, as shown in FIG. 25A to FIG. 26B, the locking device 70 includes the lever member 79 that can release engagement by the hook members 71. The lever member 79 is slidable in the depth direction along the bottom surface of the scanner portion (f). The lever member 79 includes an operation portion 79a that is exposed on the front surface of the scanner portion (f). The lever member 79 is an elongated member that is formed of resin and extends from the operation portion 79a to the far side of the scanner portion (f). The lever member 79 includes a cam portion 79b having an inclined surface, in the end portion on the far side. The lever member 79 is supported by a support frame 91 provided in the scanner portion (f) so as to be slidable in the depth direction. A spring member 92 that urges the operation portion 79a toward the far side is mounted to the support frame 91. The spring member 92 urges the operation portion 79a toward the rear side, to urge the lever member 79 toward the rear side.

The operation portion 79a is operated in order to unlock the scanner portion (f) relative to the apparatus body 10. Specifically, the operation portion 79a is operated and moved in the front direction (unlocking direction), by a user, for the unlocking. When the operation portion 79a is operated and moved in the front direction, to move the lever member 79 in the front direction, the cam portion 79b presses the cam portion 74 of the sliding member 75 according to the movement of the lever member 79 to slide the sliding member 75 in the direction (unlocking direction) in which the sliding member 75 moves away from the opening and closing operation locking unit 50. Thus, the sliding member 75 moves from the second engaging position to the second disengaging position. When the operation of the operation portion 79a is stopped, the lever member 79 is returned to its original position by means of the spring member 92. Thus, the sliding member 75 is also returned from the second disengaging position to the second engaging position through the cam portion 79b and the cam portion 74. When the regulation portion 63e and the engagement piece 77 engage with each other, and movement of the sliding member 75 is prevented, the operation portion 79a cannot be moved in the front direction. In this structure, the scanner portion (f) can be prevented from performing opening operation in a state where the document holder (h) is not closed (the document holder (h) cannot be locked).

Subsequently, an opening operation of the scanner portion (f) in the multifunction peripheral P2 will be described.

A user firstly closes the document holder (h) that is provided so as to be openable and closable relative to the scanner portion (f) as shown in FIG. 12. When the document holder (h) has been closed, the locking member 31 shown in FIG. 14 is inserted into the opening 12 shown in FIG. 13. The opening 12 is formed so as to be coplanar with the document placing surface 11, and is closed by the movable member 63 as shown in FIG. 28. The movable member 63 is pressed by the locking member 31 to move from the closing position to the opening position against an urging force of the spring member 64 (see FIG. 18). When the movable member 63 is moved downward, the regulation portion 63e formed in the movable member 63 is also moved downward. As shown in FIG. 20A, when the movable member 63 is positioned at the opening position, the opening 63d and the engagement piece 77 face each other. Thus, prevention of sliding of the sliding member 75 is released, and the user is allowed to operate the operation portion 79a of the lever member 79.

Next, the user operates to draw, in the front direction, the operation portion 79a (see FIG. 12) that is exposed on the front surface of the scanner portion (f). When the operation portion 79a is operated and moved in the front direction, a force in the drawing direction is applied to the sliding member 75 through the cam portion 79b and the cam portion 74, to move the sliding member 75 in the unlocking direction, as shown in FIG. 24B. Thus, the hook members 71 and the engaging portions 17 are disengaged from each other. When the hook members 71 are disengaged from the engaging portions 17 by the operation portion 79a being operated, locking (locking by the locking device 70) of the scanner portion (f) for preventing the scanner portion (f) from performing opening operation relative to the apparatus body 10 is released, so that the scanner portion (f) is allowed to open relative to the apparatus body 10.

Next, the user opens the scanner portion (f) provided so as to be openable and closable relative to the apparatus body 10 as shown in FIG. 27. When the scanner portion (f) has been opened, contact between the projection 37 and the linking member 68 is released as shown in FIG. 19. The linking member 68 that no longer contacts with the projection 37 is pressed back by the hook member 62 urged by the spring member 66. The hook member 62 that has pressed the linking member 68 back, is urged by the spring member 66 to automatically rotate from the first disengaging position toward the first engaging position.

The hook member 62 that rotates toward the first engaging position is inserted into the through hole 31a, to engage with the locking member 31. When the hook member 62 engages with the locking member 31, the document holder (h) is locked (locked by the locking device 60) so as to prevent the document holder (h) from performing opening operation relative to the scanner portion (f).

As described above, when the document holder (h) is locked so as to prevent the document holder (h) from performing opening operation relative to the scanner portion (f), when the scanner portion (f) is opened, the document holder (h) does not open, as shown in FIG. 27. Therefore, the center of gravity of the entirety of the multifunction peripheral P2 does not shift rearward, thereby assuredly preventing the apparatus body 10 from falling.

As described above, according to the present embodiment, the multifunction peripheral P2 includes the opening and closing operation locking unit 50. Therefore, the opening 12 is closed by the lid portion 63a of the movable member 63. Thus, damage caused by an end portion of a document falling into the opening 12 can be prevented, or a foreign object (paper scraps, dust, or the like) can be prevented from entering the apparatus through the opening 12.

Further, in the present embodiment, the scanner portion (f) includes the sliding member 75 that is slidable between the second engaging position and the second disengaging position, and the sliding member 75 includes the hook members 71 to enable locking/unlocking for opening operation relative to the apparatus body 10. Specifically, locking/unlocking of the scanner portion (f) for opening operation relative to the apparatus body 10 is realized by sliding of the sliding member 75. Therefore, poor engagement or disengagement due to torsion in the rotation direction can be prevented with enhanced effectiveness as compared to a structure in which members are rotated to cancel engagement by the hook members 71, so that engagement and disengagement by the hook members 71 can be more assuredly performed.

Further, since the scanner portion (f) can be unlocked so as to allow opening operation to be performed, by sliding of the sliding member 75, even when an urging force by an urging member in the hinge unit 19 is enhanced, poor disengagement may not occur. Therefore, an urging force of the hinge unit 19 can be enhanced to increase raising of the scanner portion (f) relative to the apparatus body 10 in the case of the scanner portion (f) being opened. As a result, a user is allowed to easily and assuredly perform visual confirmation of the raised state.

The present disclosure is not limited to each of the above embodiments. In the above embodiments, the opening 12 into which the locking member 31 is inserted is formed on the front side of the scanner portion (f). However, the present disclosure is not limited thereto. For example, the opening 12 may be formed at any position, of the scanner portion (f), which is coplanar with the document placing surface.

Further, in the first embodiment described above, the lid member 33 is moved by means of the spring member 34. However, the present disclosure is not limited thereto. For example, the lid member 33 may be moved by means of a driving source such as a motor or a solenoid. Needless to say, the similar driving source may be used for a moving mechanism for another member such as the movable member 63 of the second embodiment.

Further, in the above embodiments, the locking device 30 and the locking device 40 operate in conjunction with each other, and the locking device 60 and the locking device 70 operate in conjunction with each other. However, the present disclosure is not limited thereto. For example, each of the devices may independently operate.

Further, in the above embodiments, the multifunction peripherals P1 and P2 are described as examples of the image forming apparatus. However, the present disclosure is also applicable to image forming apparatuses such as copy machines, printers, and facsimile apparatuses.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising: a document reading device provided so as to be openable and closable relative to an apparatus body; a document holder provided so as to be openable and closable relative to the document reading device; and a locking device that locks the document holder so as to prevent the document holder from performing opening operation in the case of the document reading device performing opening and closing operation; wherein the document reading device includes an opening that is used for locking the document holder so as to prevent the document holder from performing opening operation, and the opening is formed so as to be coplanar with a document placing surface on which a document is placed; and the locking device includes:

a locking member, provided in the document holder, configured to be inserted into the opening in a state where the document holder is closed relative to the document reading device;

a hook member, provided in the document reading device, configured to be engageable with the locking member inserted in the opening, below the document placing surface;

a lid member, provided in the document reading device, configured to be movable between a closing position at which the opening is closed, and an opening position at which the opening is opened by the lid member being moved downward of the document placing surface; and an urging member, provided in the document reading device, configured to urge the lid member from the opening position toward the closing position; and the lid member moves from the closing position to the opening position against an urging force of the urging member, by being pressed by the locking member.

2. An image forming apparatus comprising: a document reading device provided so as to be openable and closable relative to an apparatus body; a document holder provided so as to be openable and closable relative to the document reading device; and a locking device that locks the document holder so as to prevent the document holder from performing opening operation in the case of the document reading device performing opening and closing operation; wherein the document reading device includes an opening that is used for locking the document holder so as to prevent the document holder from performing opening operation, and the opening is formed so as to be coplanar with a document placing surface on which a document is placed;

the locking device includes:

a locking member, provided in the document holder, configured to be inserted into the opening in a state where the document holder is closed relative to the document reading device;

a hook member, provided in the document reading device, configured to be engageable with the locking member inserted in the opening, below the document placing surface;

a lid member, provided in the document reading device, configured to be movable between a closing position at which the opening is closed, and an opening position at which the opening is opened by the lid member being moved downward of the document placing surface; and an urging member, provided in the document holder, configured to urge the locking member from the retracting position toward the projecting position;

the locking member is provided so as to be movable between a projecting position at which the locking member projects from the document holder, and a retracting position at which the locking member retracts into the document holder; and the locking member moves from the projecting position to the retracting position against an urging force of the urging member when a foreign object is caught by the locking member which is being inserted into the opening.

3. An image forming apparatus comprising: a document reading device provided so as to be openable and closable relative to an apparatus body; a document holder provided so as to be openable and closable relative to the document reading device; and a locking device that locks the document holder so as to prevent the document holder from performing opening operation in the case of the document reading device performing opening and closing operation; wherein the document reading device includes an opening that is used for locking the document holder so as to prevent the document holder from performing opening operation, and the opening is formed so as to be coplanar with a document placing surface on which a document is placed; and the locking device includes:

a locking member, provided in the document holder, configured to be inserted into the opening in a state where the document holder is closed relative to the document reading device;

a hook member, configured to be engageable with the locking member inserted in the opening, below the document placing surface, provided in the document reading device so as to be movable between an engaging position at which the hook member engages with the locking member, and a disengaging position at which the hook member is disengaged from the locking member;

a lid member, provided in the document reading device, configured to be movable between a closing position at which the opening is closed, and an opening position at which the opening is opened by the lid member being moved downward of the document placing surface;

an urging member, provided in the document reading device, configured to urge the hook member from the disengaging position toward the engaging position;

a projection provided in the apparatus body; and a linking member, provided in the document reading device, configured to contact with the projection and move the hook member from the engaging position to the disengaging position against an urging force of the urging member in a state where the document reading device is closed relative to the apparatus body.

4. An image forming apparatus comprising: a document reading device provided so as to be openable and closable relative to an apparatus body; a document holder provided so as to be openable and closable relative to the document reading device; a first locking device that locks the document holder so as to prevent the document holder from performing opening operation in the case of the document reading device performing opening and closing operation; and a second locking device configured to lock the document reading device so as to prevent the document reading device from performing opening operation; wherein the document reading device includes an opening that is used for locking the document holder so as to prevent the document holder from performing opening operation, and the opening is formed so as to be coplanar with a document placing surface on which a document is placed;

the first locking device includes:

a locking member, provided in the document holder, configured to be inserted into the opening in a state where the document holder is closed relative to the document reading device;

a first hook member, provided in the document reading device, configured to be engageable with the locking member inserted in the opening, below the document placing surface;

a lid member, provided in the document reading device, configured to be movable between a closing position at which the opening is closed, and an opening position at which the opening is opened by the lid member being moved downward of the document placing surface; and the second locking device includes:

a second hook member, provided in the document reading device, configured to be movable between an engaging position at which the second hook member engages with the apparatus body and a disengaging position at which the second hook member is disengaged from the apparatus body; and a regulation member configured to prevent movement of the second hook member to the disengaging position when the lid member is positioned at the closing position, and cancel prevention of movement of the second hook member to the disengaging position when the lid member is positioned at the opening position.

5. An image forming apparatus comprising: a document reading device provided so as to be openable and closable relative to an apparatus body; a document holder provided so as to be openable and closable relative to the document reading device; a first locking device that locks the document holder so as to prevent the document holder from performing opening operation in the case of the document reading device performing opening and closing operation; and a second locking device configured to lock the document reading device so as to prevent the document reading device from performing opening operation; wherein
the document reading device includes an opening that is used for locking the document holder so as to prevent the document holder from performing opening operation, and the opening is formed so as to be coplanar with a document placing surface on which a document is placed;
the first locking device includes:
a locking member, provided in the document holder, configured to be inserted into the opening in a state where the document holder is closed relative to the document reading device;
a first hook member, provided in the document reading device, configured to be engageable with the locking member inserted in the opening, below the document placing surface;
a lid member, provided in the document reading device, configured to be movable between a closing position at which the opening is closed, and an opening position at which the opening is opened by the lid member being moved downward of the document placing surface; and
the second locking device includes:
a sliding member, provided in the document reading device so as to be slidable, configured to slide due to a force in an unlocking direction being applied to the sliding member; and
a second hook member configured to move according to movement of the sliding member, to be disengageable from the apparatus body.

6. The image forming apparatus according to claim 5, wherein
the second locking device further includes an engaging portion provided in the apparatus body; and
the second hook member locks the document reading device so as to prevent the document reading device from performing opening operation by engaging with the engaging portion.

7. The image forming apparatus according to claim 5, wherein
the second locking device further includes a lever member provided in the document reading device, and the lever member is configured to release engagement by the second hook member; and
the sliding member slides together with the second hook member due to a force in the unlocking direction being applied by the lever member in the case of the lever member being operated.

8. The image forming apparatus according to claim 5, further comprising a movable member, provided in the document reading device, configured to be movable between a closing position at which the opening is closed, and an opening position at which the opening is opened by the movable member being moved downward of the document placing surface.

9. The image forming apparatus according to claim 8, wherein
the first locking device includes an urging member provided in the document reading device, and the urging member is configured to urge the movable member from the opening position toward the closing position; and
the movable member moves from the closing position to the opening position against an urging force of the urging member, by being pressed by the locking member.

10. The image forming apparatus according to claim 5, wherein the locking member is movable between a projecting position at which the locking member projects from the document holder, and a retracting position at which the locking member retracts into the document holder.

* * * * *